US011825427B2

(12) United States Patent
Abotabl et al.

(10) Patent No.: US 11,825,427 B2
(45) Date of Patent: Nov. 21, 2023

(54) TECHNIQUES FOR PERFORMING PHYSICAL LAYER SECURITY DURING FULL-DUPLEX COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/408,193

(22) Filed: Aug. 20, 2021

(65) Prior Publication Data

US 2023/0059029 A1 Feb. 23, 2023

(51) Int. Cl.
*H04W 52/36* (2009.01)
*H04W 12/122* (2021.01)
*H04W 72/21* (2023.01)
*H04W 72/23* (2023.01)
*G01S 7/36* (2006.01)
(Continued)

(52) U.S. Cl.
CPC ............ *H04W 52/367* (2013.01); *G01S 7/36* (2013.01); *H04L 5/14* (2013.01); *H04W 12/122* (2021.01); *H04W 52/242* (2013.01); *H04W 72/0446* (2013.01); *H04W 72/0453* (2013.01); *H04W 72/21* (2023.01); *H04W 72/23* (2023.01)

(58) Field of Classification Search
CPC ............ H04W 52/367; H04W 12/122; H04W 52/242; H04W 72/0446; G01S 7/36; H04L 5/14
See application file for complete search history.

(56) References Cited

U.S. PATENT DOCUMENTS

2004/0203423 A1\* 10/2004 Kurhila ................. H04W 24/00
455/67.11
2009/0209196 A1 8/2009 Haverty
(Continued)

FOREIGN PATENT DOCUMENTS

WO WO-2006039936 A1 4/2006

OTHER PUBLICATIONS

International Search Report and Written Opinion—PCT/US2022/038053—ISA/EPO—dated Oct. 18, 2022.

*Primary Examiner* — Christine Ng
(74) *Attorney, Agent, or Firm* — Holland & Hart LLP/Qualcomm Incorporated

(57) ABSTRACT

Methods, systems, and devices for wireless communications are described. A user equipment (UE) may receive, from a base station, a control signal scheduling the UE to receive a downlink message from the base station using a set of time and frequency resources. The UE may identify an aggressor UE attempting to receive uplink communications, downlink communications, or both, transmitted between the UE and the base station and determine a transmit power for transmitting a jamming signal to the aggressor UE during the set of time and frequency resources. The UE may apply a jamming signal power scheme to the jamming signal by either using the determined transmit power or adjusting the determined transmit power in accordance with the jamming signal power scheme.

29 Claims, 15 Drawing Sheets

(51) Int. Cl.
  *H04L 5/14*       (2006.01)
  *H04W 52/24*      (2009.01)
  *H04W 72/0446*    (2023.01)
  *H04W 72/0453*    (2023.01)

(56) References Cited

U.S. PATENT DOCUMENTS

| | | | |
|---|---|---|---|
| 2013/0254277 A1* | 9/2013 | Vasudevan | H04W 76/14 709/204 |
| 2014/0226578 A1* | 8/2014 | Zhu | H04W 52/146 370/329 |
| 2020/0106545 A1* | 4/2020 | Askar | H04W 72/541 |
| 2020/0288313 A1* | 9/2020 | Kunz | H04L 63/1466 |
| 2020/0367271 A1* | 11/2020 | Bai | H04W 72/20 |
| 2021/0203456 A1* | 7/2021 | Zhao | H04B 7/0626 |
| 2021/0307036 A1* | 9/2021 | Myung | H04L 5/0053 |
| 2021/0409146 A1* | 12/2021 | Lee | H04K 3/00 |
| 2022/0232481 A1* | 7/2022 | Kusashima | H04W 52/10 |
| 2022/0408420 A1* | 12/2022 | Li | H04L 1/08 |
| 2022/0416958 A1* | 12/2022 | Yan | H04W 52/50 |
| 2023/0030483 A1* | 2/2023 | Ji | H04W 52/54 |
| 2023/0052574 A1* | 2/2023 | Sadikin | H04W 8/005 |

* cited by examiner

TECHNIQUES FOR PERFORMING PHYSICAL LAYER SECURITY DURING FULL-DUPLEX COMMUNICATIONS

FIELD OF TECHNOLOGY

The following relates to wireless communications, including techniques for performing physical layer security during full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive scheduling information from a base station indicating the UE to transmit or receive one or more signals. In some cases, a nearby UE (e.g., an eavesdropper UE, an aggressor UE) may attempt to receive the one or more signals from the UE or the base station. Techniques for securing the one or more signals from the nearby UE may be improved.

SUMMARY

The described techniques relate to improved methods, systems, devices, and apparatuses that support techniques for performing physical layer security during full-duplex communications. Generally, the described techniques provide for improved methods of securing communications between a user equipment (UE) and base station (e.g., or some other network device). In some cases, a UE may be capable of full-duplex communications in which the UE may transmit and receive communications in overlapping time resources, frequency resources, or both. To secure the communications, a full-duplex capable UE may transmit a signal (e.g., a jamming signal) to an aggressor device in the same resources the full-duplex capable UE is scheduled to receive a message from a base station. The aggressor UE may receive the jamming signal and be unable to identify the message transmitted from the base station to the full-duplex UE. Accordingly, the full-duplex UE may secure the message from the base station by transmitting a jamming signal. In some cases, the full-duplex UE may transmit the jamming signal in accordance with a jamming signal power scheme so as to balance self-interference experienced at the full-duplex UE and security of communications with the base station.

For example, a UE (e.g., a full-duplex UE) may receive, from a base station, a control signal scheduling the UE to receive a downlink message from the base station using a set of time and frequency resources. The UE may identify an aggressor UE attempting to receive uplink communications, downlink communications, or both, transmitted between the UE and the base station and determine a transmit power for transmitting a jamming signal to the aggressor UE during the set of time and frequency resources. The UE may apply a jamming signal power scheme to the jamming signal by either using the determined transmit power or adjusting the determined transmit power in accordance with the jamming signal power scheme.

A method for wireless communications at a UE is described. The method may include receiving, from a base station, a control signal scheduling the UE to receive a downlink message from the base station using a set of time and frequency resources, identifying an aggressor UE in between a communication range of the UE and the base station, determining a transmit power for transmitting a jamming signal during the set of time and frequency resources, and applying a jamming signal power scheme to the jamming signal by either using the determined transmit power or adjusting the determined transmit power in accordance with the jamming signal power scheme.

An apparatus for wireless communications is described. The apparatus may include a processor, memory coupled with the processor, and instructions stored in the memory. The instructions may be executable by the processor to cause the apparatus to receive, from a base station, a control signal scheduling the UE to receive a downlink message from the base station using a set of time and frequency resources, identify an aggressor UE in between a communication range of the UE and the base station, determine a transmit power for transmitting a jamming signal during the set of time and frequency resources, and apply a jamming signal power scheme to the jamming signal by either using the determined transmit power or adjusting the determined transmit power in accordance with the jamming signal power scheme.

Another apparatus for wireless communications is described. The apparatus may include means for receiving, from a base station, a control signal scheduling the UE to receive a downlink message from the base station using a set of time and frequency resources, means for identifying an aggressor UE in between a communication range of the UE and the base station, means for determining a transmit power for transmitting a jamming signal during the set of time and frequency resources, and means for applying a jamming signal power scheme to the jamming signal by either using the determined transmit power or adjusting the determined transmit power in accordance with the jamming signal power scheme.

A non-transitory computer-readable medium storing code for wireless communications is described. The code may include instructions executable by a processor to receive, from a base station, a control signal scheduling the UE to receive a downlink message from the base station using a set of time and frequency resources, identify an aggressor UE in between a communication range of the UE and the base station, determine a transmit power for transmitting a jamming signal during the set of time and frequency resources, and apply a jamming signal power scheme to the jamming signal by either using the determined transmit power or adjusting the determined transmit power in accordance with the jamming signal power scheme.

In some examples of the method, apparatuses, and non-transitory computer-readable medium described herein, identifying the aggressor UE may further include receiving a signal from the base station including at least one of a direction to the aggressor UE or an estimated path between the UE and the aggressor UE.

Some examples of the method, apparatuses, and non-transitory computer-readable medium described herein may further include operations, features, means, or instructions for determining a level of self-interference associated with transmitting the jamming signal with the transmit power. In some cases, the method, apparatuses, and non-transitory computer-readable medium described herein may further include operations, features, means, or instructions for comparing the level of self-interference to a self-interference threshold.

In some examples of the method, apparatuses, and non-transitory computer-readable medium described herein, applying the jamming signal power scheme may include operations, features, means, or instructions for reducing the transmit power for the jamming signal based on determining that the level of self-interference may be greater than the self-interference threshold.

In some examples of the method, apparatuses, and non-transitory computer-readable medium described herein, applying the jamming signal power scheme may include operations, features, means, or instructions for refraining from transmitting the jamming signal based on determining that the level of self-interference may be greater than the self-interference threshold.

In some examples of the method, apparatuses, and non-transitory computer-readable medium described herein, applying the jamming signal power scheme may include operations, features, means, or instructions for transmitting the jamming signal using the transmit power based on determining the level of self-interference (e.g., determining that the level of self-interference may be greater than, equal to, or less than the self-interference threshold).

Some examples of the method, apparatuses, and non-transitory computer-readable medium described herein may further include operations, features, means, or instructions for receiving, from the base station, an indication of a range of potential path loss values, the range including a minimum potential path loss and a maximum potential path loss between the UE and the aggressor UE and determining the transmit power for transmitting the jamming signal based on the maximum potential path loss.

Some examples of the method, apparatuses, and non-transitory computer-readable medium described herein may further include operations, features, means, or instructions for determining the transmit power for transmitting the jamming signal using a next lower potential path loss in the range after the maximum potential path loss based on determining that the level of self-interference associated with using the maximum potential path loss to determine that transmit power may be greater than the self-interference threshold.

In some examples of the method, apparatuses, and non-transitory computer-readable medium described herein, the UE may be configured with a procedure for determining the level of self-interference based on the transmit power.

Some examples of the method, apparatuses, and non-transitory computer-readable medium described herein may further include operations, features, means, or instructions for receiving an indication of a maximum transmission power for transmitting jamming signals, where determining a transmit power may be based on the maximum transmission power.

Some examples of the method, apparatuses, and non-transitory computer-readable medium described herein may further include operations, features, means, or instructions for receiving, from the base station, an indication of a path loss between the UE and the aggressor UE, where determining the transmit power may be based on the path loss.

Some examples of the method, apparatuses, and non-transitory computer-readable medium described herein may further include operations, features, means, or instructions for receiving, from the base station, an indication of a direction to transmit the jamming signal, where applying the jamming signal power scheme includes transmitting the jamming signal in the direction indicated by the base station.

Some examples of the method, apparatuses, and non-transitory computer-readable medium described herein may further include operations, features, means, or instructions for receiving, from the base station, an indication of multiple directions to transmit the jamming signal, the multiple directions based on multiple aggressor UEs and applying a spatial filter to transmit the jamming signal, where the spatial filter may be selected based on transmitting the jamming signal in a direction of a majority of the multiple aggressor UEs.

Some examples of the method, apparatuses, and non-transitory computer-readable medium described herein may further include operations, features, means, or instructions for receiving an indication of the jamming signal power scheme to use, the indication included in a radio resource control message, or a downlink control information message, or both.

Some examples of the method, apparatuses, and non-transitory computer-readable medium described herein may further include operations, features, means, or instructions for transmitting, to the base station, an indication of the jamming signal power scheme being used by the UE to transmit the jamming signal, the indication included in an uplink control information message.

Some examples of the method, apparatuses, and non-transitory computer-readable medium described herein may further include operations, features, means, or instructions for receiving an indication of a set of parameters to use for the jamming signal power scheme, the set of parameters including time resources, frequency resources, spatial information, a transmit power control equation, or a combination thereof, where determining the transmit power may be based on the set of parameters.

In some examples of the method, apparatuses, and non-transitory computer-readable medium described herein, receiving the indication of the set of parameters may include operations, features, means, or instructions for receiving a radio resource control message, or a downlink control information message, or both including the indication of the set of parameters.

Some examples of the method, apparatuses, and non-transitory computer-readable medium described herein may further include operations, features, means, or instructions for receiving a set of multiple sets of parameters associated with the jamming signal, each set of parameters received via a radio resource control message and receiving a message indicating a set of parameters of the set of multiple sets of parameters to use for the jamming signal power scheme, the message may be a downlink control information message, where determining the transmit power may be based on the set of parameters.

A method for wireless communications at a base station is described. The method may include transmitting, to a UE, a control signal scheduling the UE to receive a downlink message from the base station using a set of time and frequency resources, identifying an aggressor UE in a communications range of the UE and the base station, and transmitting an indication of a jamming signal power scheme to use by the UE for transmitting, during the set of time and frequency resources, a jamming signal.

An apparatus for wireless communications is described. The apparatus may include a processor, memory coupled with the processor, and instructions stored in the memory. The instructions may be executable by the processor to cause the apparatus to transmit, to a UE, a control signal scheduling the UE to receive a downlink message from the base station using a set of time and frequency resources, identify an aggressor UE in a communications range of the UE and the base station, and transmit an indication of a jamming signal power scheme to use by the UE for transmitting, during the set of time and frequency resources, a jamming signal.

Another apparatus for wireless communications is described. The apparatus may include means for transmitting, to a UE, a control signal scheduling the UE to receive a downlink message from the base station using a set of time and frequency resources, means for identifying an aggressor UE in a communications range of the UE and the base station, and means for transmitting an indication of a jamming signal power scheme to use by the UE for transmitting, during the set of time and frequency resources, a jamming signal.

A non-transitory computer-readable medium storing code for wireless communications is described. The code may include instructions executable by a processor to transmit, to a UE, a control signal scheduling the UE to receive a downlink message from the base station using a set of time and frequency resources, identify an aggressor UE in a communications range of the UE and the base station, and transmit an indication of a jamming signal power scheme to use by the UE for transmitting, during the set of time and frequency resources, a jamming signal.

In some examples of the method, apparatuses, and non-transitory computer-readable medium described herein, transmitting the indication of the jamming signal power scheme may include operations, features, means, or instructions for transmitting a message indicating the UE to determine a level of self-interference associated with transmitting the jamming signal in accordance with a transmit power and to compare the level of self-interference to a self-interference threshold.

In some examples of the method, apparatuses, and non-transitory computer-readable medium described herein, transmitting the message may include operations, features, means, or instructions for transmitting the message indicating the UE to reduce the transmit power for the jamming signal if the level of self-interference may be greater than the self-interference threshold.

In some examples of the method, apparatuses, and non-transitory computer-readable medium described herein, transmitting the message may include operations, features, means, or instructions for transmitting the message indicating the UE to refrain from transmitting the jamming signal if the level of self-interference may be greater than the self-interference threshold.

In some examples of the method, apparatuses, and non-transitory computer-readable medium described herein, transmitting the message may include operations, features, means, or instructions for transmitting the message indicating the UE to transmit the jamming signal using the transmit power based on the self-interference threshold.

Some examples of the method, apparatuses, and non-transitory computer-readable medium described herein may further include operations, features, means, or instructions for receiving one or more path loss reference signals from the aggressor UE and the UE and transmitting, to the UE, a signal indicating a range of potential path loss values based on the one or more path loss reference signals received from the aggressor UE and the UE, the range including a minimum potential path loss and a maximum potential path loss between the UE and the aggressor UE.

In some examples of the method, apparatuses, and non-transitory computer-readable medium described herein, transmitting the indication of the jamming signal power scheme may include operations, features, means, or instructions for transmitting a second signal indicating the UE to determine the transmit power for transmitting the jamming signal starting with the maximum potential path loss, then using a next lower potential path loss in the range after the maximum potential path loss if the level of self-interference associated with using the maximum potential path loss may be greater than the self-interference threshold.

Some examples of the method, apparatuses, and non-transitory computer-readable medium described herein may further include operations, features, means, or instructions for transmitting, to the UE, a signal indicating a procedure for determining the level of self-interference based on the transmit power.

Some examples of the method, apparatuses, and non-transitory computer-readable medium described herein may further include operations, features, means, or instructions for transmitting a message indicating a maximum transmission power for transmitting jamming signals by the UE.

Some examples of the method, apparatuses, and non-transitory computer-readable medium described herein may further include operations, features, means, or instructions for receiving one or more path loss reference signals from the aggressor UE and the UE and transmitting, to the UE, a message indicating a path loss between the UE and the aggressor UE based on the one or more path loss reference signals received from the aggressor UE and the UE.

In some examples of the method, apparatuses, and non-transitory computer-readable medium described herein, transmitting the indication of the jamming signal power scheme may include operations, features, means, or instructions for transmitting, to the UE, a message indicating a direction to transmit the jamming signal.

In some examples of the method, apparatuses, and non-transitory computer-readable medium described herein, transmitting the indication of the jamming signal power scheme may include operations, features, means, or instructions for transmitting, to the UE, a first message indicating multiple directions to transmit the jamming signal, the multiple directions based on multiple aggressor UEs and transmitting a second message indicating the UE to select a spatial filter for transmitting the jamming signal in a direction of a majority of the multiple aggressor UEs.

In some examples of the method, apparatuses, and non-transitory computer-readable medium described herein, transmitting the indication of the jamming signal power scheme may include operations, features, means, or instructions for transmitting a radio resource control message, or a downlink control information message, or both, including the indication of the jamming signal power scheme.

Some examples of the method, apparatuses, and non-transitory computer-readable medium described herein may further include operations, features, means, or instructions for receiving, from the UE, a signal indicating the jamming signal power scheme being used by the UE to transmit the jamming signal, the indication included in an uplink control information message.

Some examples of the method, apparatuses, and non-transitory computer-readable medium described herein may further include operations, features, means, or instructions for transmitting, to the UE, a message indicating a set of parameters to use for the jamming signal power scheme, the set of parameters including time resources, frequency resources, spatial information, a transmit power control equation, or a combination thereof.

In some examples of the method, apparatuses, and non-transitory computer-readable medium described herein, transmitting the message may include operations, features, means, or instructions for transmitting a radio resource control message, or a downlink control information message, or both including the set of parameters.

Some examples of the method, apparatuses, and non-transitory computer-readable medium described herein may further include operations, features, means, or instructions for transmitting a set of multiple sets of parameters associated with the jamming signal, each set of parameters transmitted via a radio resource control message and transmitting a message indicating a set of parameters of the set of multiple sets of parameters to use for the jamming signal power scheme, where the message may be a downlink control information message.

DETAILED DESCRIPTION

Figure 1:
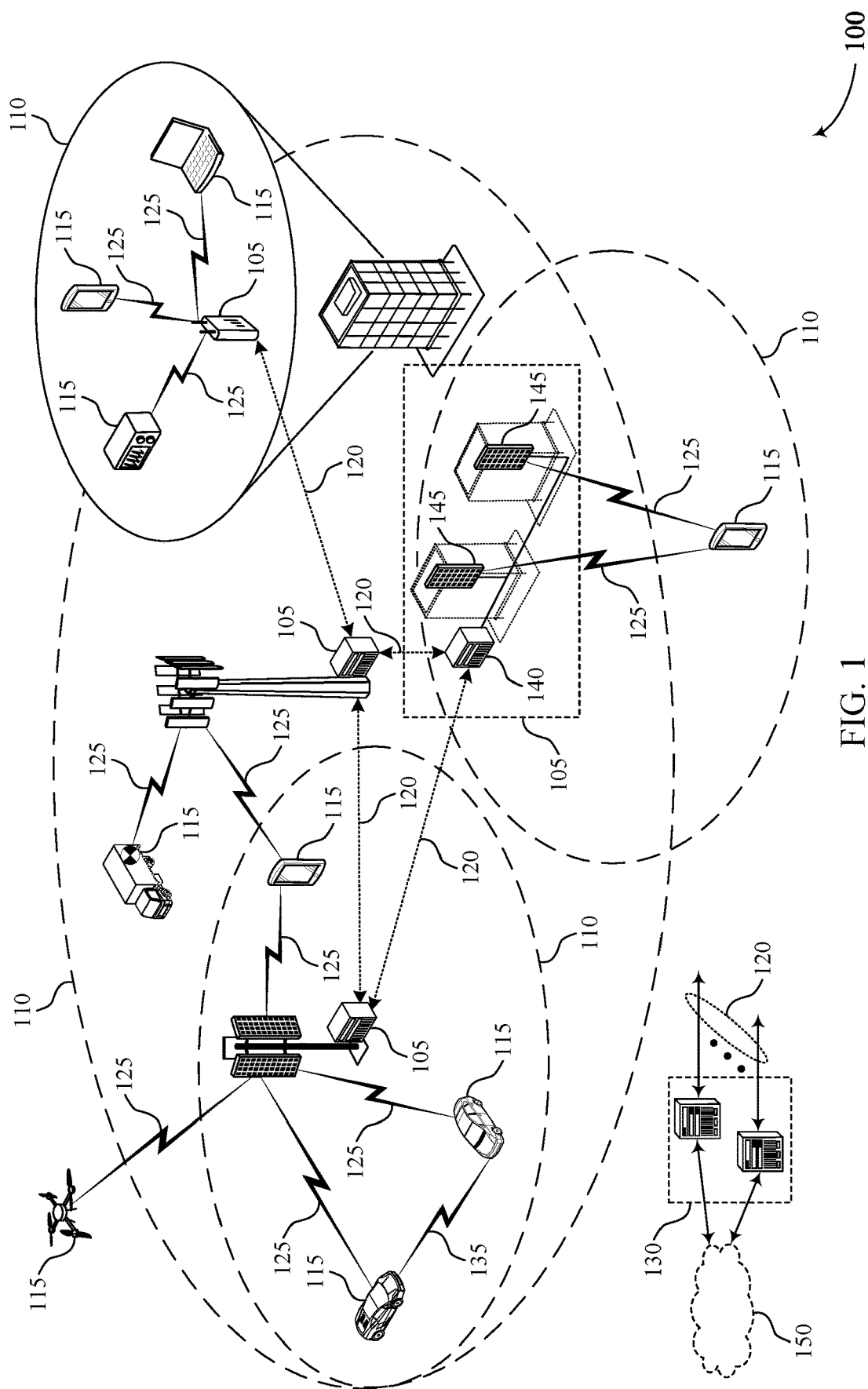
FIG. 1 illustrates an example of a wireless communications system that supports techniques for performing physical layer security during full-duplex communications in accordance with aspects of the present disclosure.

A wireless multiple-access communications system may include one or more base stations or one or more network access nodes, each simultaneously or concurrently supporting communication for multiple communication devices, which may be otherwise known as user equipment (UE). In some examples, a communication device (e.g., a base station, a UE, etc.) may support concurrent transmission and reception as part of a full-duplex mode or full-duplex communications. Techniques are desired for supporting and leveraging full-duplex communications.

In some wireless communications system, a UE may operate in a full-duplex mode, where the UE may transmit on an uplink and receive on a downlink concurrently (e.g., at least partially overlapping), either on the same frequency resources or on different frequency resources which may be separated by a guard band. In some cases, an adverse wireless communication device (e.g., aggressor device, eavesdropper device, advisory device, etc. where the device may be another base station, UE, node, etc.) may be geographically located near (e.g., in close proximity to) a wireless communication device (e.g., the UE operating in the full-duplex mode) attempting to receive downlink transmissions. The adverse wireless communication device may gain access to the transmission and learn information about the intended wireless communication device or the transmitting wireless communication device (or other information), thereby infiltrating the unprotected transmission and placing the intended wireless communication device at risk. Similarly, the adverse wireless communication device may attempt to detect information sent by the transmitting device and may, therefore, learn information regarding the data stored in the transmission. Thus, there exists need for enhanced physical layer security to prevent the adverse wireless communication device from accessing the transmission.

As described herein, if a UE is a full-duplex device (e.g., capable of concurrent transmission and reception) and an adverse wireless communication device is near to the UE, a base station may indicate for the UE to transmit information, such as random information (e.g., a set of arbitrary bits, a jamming signal), in the direction of the adverse wireless communication device on at least partially overlapping time and/or frequency resources that are also used for receiving a downlink message from the base station. By transmitting the information in the direction of the adverse wireless communication device, the UE may cause entropy overhead to the adverse wireless communication device, impacting an ability of the adverse wireless communication device to decode portions of the downlink message transmitted to and intended for the UE. Accordingly, the intended UE may receive the downlink message from the base station on a first set of time and frequency resources according to control signaling scheduling the downlink message, scheduling the information transmission (e.g., random information transmission), or scheduling both and may concurrently transmit the information (e.g., random information), in the direction of the adverse wireless communication device on a second set of time and frequency resources that at least partially overlap with the first set of time and frequency resources based on the control signaling.

In this way, the full-duplex UE may secure the downlink signal from adversary UEs via jamming. However, full-duplex communications may result in self-interference at the full-duplex UE. Accordingly, there is a trade-off between securing the downlink signal from adversary UEs and limiting self-interference of the full-duplex UE.

To achieve an effective trade-off, the full-duplex UE may be configured to calculate a transmission power of the jamming signal and, based on the calculated power, the full duplex UE may determine a level of self-interference that may result by transmitting the jamming signal. The full-duplex UE may be configured with a self-interference threshold. If the calculated self-interference is greater than the threshold, the full-duplex UE may be configured to reduce the transmission power of the jamming signal until the self-interference is below the threshold. In some cases, the full duplex UE may be configured with a maximum jamming transmission power that is specific for transmitting the jamming signal. The maximum jamming transmission power may be set so as to reduce self-interference. In some cases, the full-duplex UE may be configured to transmit the jamming signal regardless of the self-interference level is (e.g., even if the self-interference is greater than the threshold). In some cases, the full-duplex UE may be configured to drop the jamming signal such as if the self-interference is greater than the threshold.

Particular aspects of the subject matter described herein may be implemented to realize one or more advantages. The described techniques may support improvements in securing communications between devices by balancing the security with self-interference at a device. The described techniques may support improved reliability, and improved performance of a full-duplex device, among other advantages. As such, supported techniques may include improved network operations and, in some examples, may promote network efficiencies, among other benefits.

Aspects of the disclosure are initially described in the context of wireless communications systems. Aspects are then described with reference to a process flow. Aspects of the disclosure are further illustrated by and described with reference to apparatus diagrams, system diagrams, and flowcharts that relate to techniques for performing physical layer security during full-duplex communications.

FIG. 1 illustrates an example of a wireless communications system 100 that supports techniques for performing physical layer security during full-duplex communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, a UE 115 may be capable of full-duplex communications in which the UE 115 may transmit and receive communications in overlapping time resources, frequency resources, or both. To secure communications between the UE 115 and a base station 105, the full-duplex capable UE 115 may transmit a signal (e.g., a jamming signal) to an aggressor UE 115 in the same resources the full-duplex capable UE 115 is scheduled to receive a message from a base station 105. The aggressor UE 115 may receive the jamming signal and be unable to identify the message transmitted from the base station 105 to the full-duplex UE 115. Accordingly, the full-duplex UE 115 may secure the message from the base station 105 by transmitting a jamming signal. In some cases, the full-duplex UE 115 may transmit the jamming signal in accordance with a jamming signal power scheme so as to balance self-interference experienced at the full-duplex UE 115 and securing communications with the base station 105.

For example, a UE 115 (e.g., a full-duplex UE 115) may receive, from a base station 105, a control signal scheduling the UE 115 to receive a downlink message from the base station 105 using a set of time and frequency resources. The UE 115 may identify an aggressor UE 115 attempting to receive uplink communications, downlink communications, or both, transmitted between the UE 115 and the base station 105 and determine a transmit power for transmitting a jamming signal to the aggressor UE 115 during the set of time and frequency resources. The UE 115 may apply a jamming signal power scheme to the jamming signal by either using the determined transmit power or adjusting the determined transmit power in accordance with the jamming signal power scheme.

Figure 2:
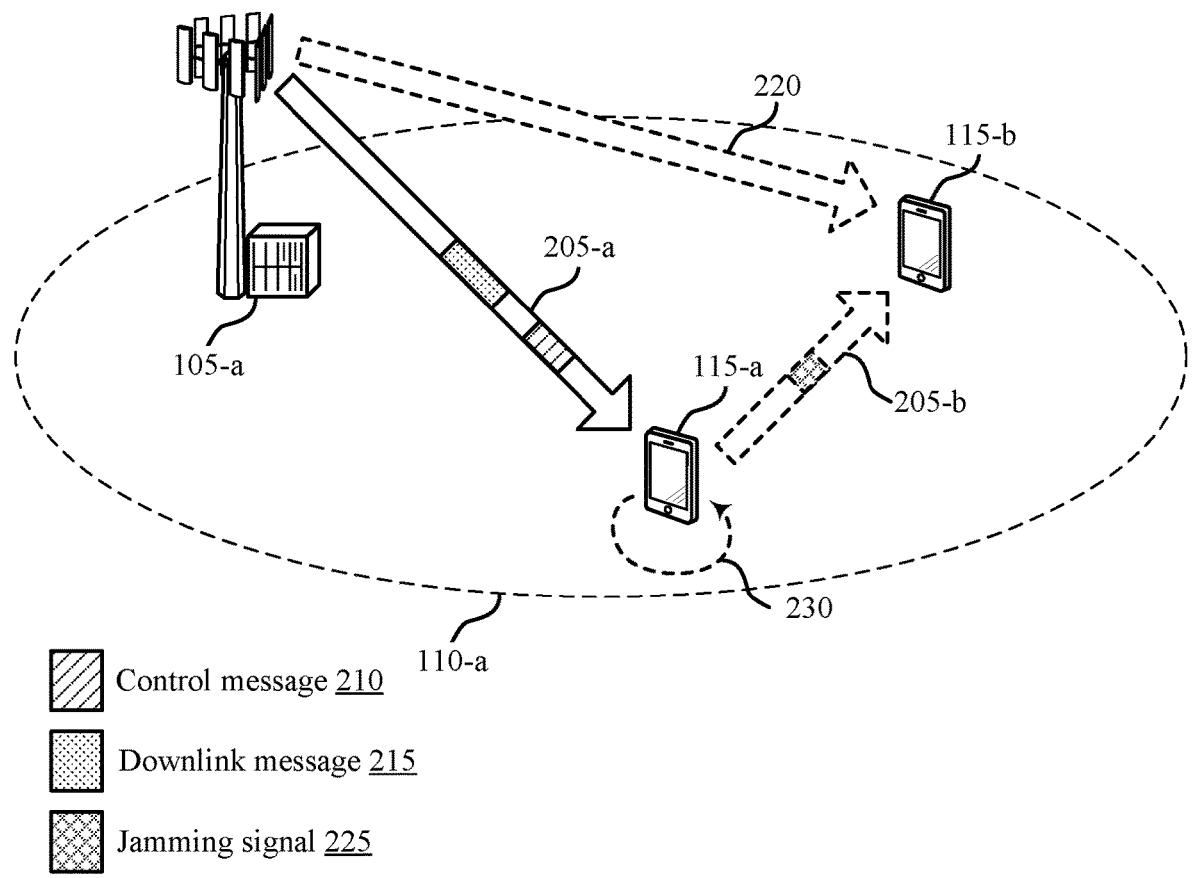
FIG. 2 illustrates an example of a wireless communications system that supports techniques for performing physical layer security during full-duplex communications in accordance with aspects of the present disclosure.

FIG. 2 illustrates an example of a wireless communications system 200 that supports techniques for performing physical layer security during full-duplex communications in accordance with aspects of the present disclosure. In some examples, wireless communications system 200 may implement aspects of, or may be implemented by aspects of wireless communications system 100. For example, wireless communications system 200 may include a base station 105-*a* and UE 115-*a*, and 115-*b*, which may represent examples of corresponding base stations 105 and UEs 115, respectively, as described with reference to FIG. 1. Base station 105-*a* may serve geographic coverage area 110-*a*, where UE 115-*b* may be an aggressor UE 115 while in or out of geographic coverage area 110-*a*. In some examples, base station 105-*a*, UE 115-*a*, or both may support half-duplex communications or full-duplex communications or both. While shown using base station 105-*a* and UE 115-*a*, the techniques described herein may be performed by additional devices capable of full-duplex communications.

In some wireless communications systems, such as wireless communications systems 200, devices (e.g., UE 115-*a*) may be capable of operating in accordance with a full duplex mode in which the device may transmit and receive messages in overlapping resources. A UE 115 (e.g., or some other device) that operates in the full-duplex mode may use in-band full-duplex (IBFD), sub-band full-duplex (SBFD), or a combination thereof. A UE 115 that supports IBFD may transmit and receive on same time and frequency resources. Additionally or alternatively, a UE 115 that supports SBFD may transmit and receive on same time resources but on different frequency resources. In an example of IBFD, a base station 105 may allocate downlink resources and uplink resources for a UE 115 in overlapping frequency resources. In some cases, the downlink resources and the uplink resources may completely overlap or partially overlap such that a UE 115 may transmit and receive on overlapping time and frequency resources. For example, the uplink resource may completely overlapping with all or a portion of the downlink resources. In another example, a portion of the uplink resources may overlap with all or a portion of the downlink resources.

In an example of SBFD, a base station 105 may allocate downlink resources and uplink resources for a UE 115 in separate frequency resources that occur during a same time period, such that the UE 115 and the base station 105 may transmit and receive over overlapping time resources and different frequency resources on the same radio frequency spectrum band. In some examples, the downlink resources and the uplink resources may be separated in frequency by a guard band. A guard band may be, for example, one or a few RBs (e.g., five RBs) separating the downlink resources and the uplink resources in the frequency domain.

As described herein, a full-duplex device may achieve directional physical layer security based on utilizing full-duplex communications. For example, using the techniques described herein, the full-duplex device may assist in securing its own reception by concurrently transmitting random information (e.g., a jamming signal 225, a set of arbitrary bits, garbage) in the direction of an adverse wireless communication device, such as UE 115-*b*. For example, the full-duplex device may transmit the random information with a code rate that fills the capacity of the adversary device such that the adversary device, while receiving the random information, may not detect any useful information from a downlink transmission being received by the full-duplex UE. In some cases, the adverse wireless communication device may be geographically located near (e.g., in close proximity to) the full-duplex device attempting to receive downlink transmissions. The adverse wireless communication device may attempt to gain access to the downlink transmission and learn information about the full-duplex device that was intended to receive the downlink transmission, the device transmitting the downlink transmission, or both. Accordingly, the device transmitting the downlink transmission or a scheduling network device (e.g., base station 105-*a*), may detect the adverse wireless communication device (e.g., a possible attacker, an eavesdropper) is near the full-duplex device and may indicate for the full-duplex device to transmit the random information in the direction of the adverse wireless communication device based on detecting the adverse wireless communication device is near the full-duplex device. In some cases, the full duplex device may detect the adverse wireless communication is near the full-duplex device and may determine to transmit the random information in the direction of the adverse wireless communication device based on detecting the adverse wireless communication device is near.

In some examples, base station 105-*a* may have a downlink message 215 (e.g., a control message, a shared channel message, data) to transmit to UE 115-*a*. Accordingly, base station 105-*a* may transmit a control message 210 to UE 115-*a* to indicate for UE 115-*a* to monitor for the downlink message 215. In some cases, base station 105-*a* may detect UE 115-*b* as an adverse device (e.g., based on proximity to UE 115-*a*, base 105-*a*, or both) such that UE 115-*b* may detect and potentially receive a leakage 220 corresponding to the downlink message 215 intended for UE 115-*a*. Base station 105-*a* may transmit an indication to UE 115-*a* for UE 115-*a* to transmit random information in the form of a jamming signal 225 in the direction of UE 115-*b* on at least partially overlapping time and frequency resources as the resources used to receive the downlink message 215. In some cases, base station 105-*a* may include the jamming signal indication in the control message 210. In some cases, UE 115-*a* may identify UE 115-*b* as a potential aggressor UE 115 and determine to transmit a jamming signal in the direction of UE 115, autonomously (e.g., without the indication from base station 105-*a*). Subsequently, UE 115-*a* may receive the downlink message 215 from base station 105-*a* on a first set of time and frequency resources via communication link 205-*a* (e.g., a downlink communications link, a beam, a channel) and may concurrently transmit the jamming signal 225 in the direction of UE 115-*b* (e.g., via communications link 205-*b*) on a second set of time and frequency resources that at least partially overlap with the first set of time and frequency resources. That is, UE 115-*a* may transmit the jamming signal 225 on a same set of resources or on resources that at least partially overlap with the resources used to receive the downlink message 215.

In some examples, UE 115-*a* may randomly generate bits to a specified size for the jamming signal 225 because there is not actual information being transmitted with the jamming signal 225. The size of the random information transmitted in the jamming signal 225 may need to be a substantial size because if the amount of randomly generated bits are too small, UE 115-*b* may detect that UE 115-*a* is merely transmitting random information and can subtract the random bits from the leakage 220 to detect information from downlink message 215. In some cases, UE 115-*a* may autonomously calculate the size of the arbitrary signal, be configured with the size, receive an indication of the size (e.g., via radio resource control (RRC), medium access control (MAC) control element (MAC-CE), or RRC), or a combination thereof.

UE 115-*a* may be configured to transmit the jamming signal 225 in accordance with a transmission power. In some cases, UE 115-*a* may be configured with or receive an indication of an equation to use for calculating the transmission power of the jamming signal 225. The jamming signal transmission power equation may be as shown in Equation 1.

$$P_{PUSCH}(j, q, l) = \min\{P_{CMAX}, P_{O\_PUSCH}(j) + 10 \cdot \log_{10}(2^{\mu} \cdot M_{RB}^{PUSCH}) + \alpha(j) \cdot PL(q) + \Delta_{TF} + f(l)\} \quad (1)$$

$P_{PUSCH}$ may refer to the transmission power of the jamming signal 225, $P_{CMAX}$ may refer to a maximum transmission power the UE 115 can use to transmit, $P_{O\_PUSCH}$ may refer to a parameter composed of the sum of a cell specific nominal component and a UE specific component, $M_{RB}^{PUSCH}$ may refer to a bandwidth of the physical uplink shared channel (PUSCH) resource assignment expressed in number of resource blocks valid for subframe α may refer to a 3-bit cell specific parameter provided by higher layers, PL may refer to the path loss between the two devices associated with the jamming signal (e.g., path loss between UE 115-*a* and UE 115-*b*), $\Delta_{TF}$ may be calculated by another equation, and f may be calculated by another equation.

Accordingly, if UE 115-*b* attempts to access the downlink message 215, such as via the leakage 220, the jamming signal 225 transmitted by UE 115-*a* in the direction of UE 115-*b* may increase signaling overhead and entropy for UE 115-*b*, thereby decreasing an ability of UE 115-*b* to decode the downlink message 215 and from potentially learning secure information about UE 115-*a*, base station 105-*a*, the contents of the downlink message 215, or a combination thereof.

Due to transmitting and receiving in overlapping resources, UE 115-*a* may experience self-interference 230. In self-interference 230, a full-duplex device may experience interference from a signal which is communicated by the same full-duplex device (e.g., at a receiving or sensing side of the full-duplex device). For example, a transmission by a full-duplex device may interfere with reception at the full-duplex device, as energy propagated by antennas used for the transmission may reach antennas used for reception.

In some cases, a full-duplex device may experience interference which may impact communication procedures performed at the full-duplex device. Although the full-duplex device may be capable of transmission and reception simultaneously, a first signal received by the full-duplex device may prevent the full-duplex device from gaining access to a channel to transmit a second signal. Additionally or alternatively, a first signal transmitted by the full-duplex device may prevent the full-duplex from reliably receiving a second signal.

Accordingly, UE 115-*a* and/or base station 105-*a* may aim to balance the trade-off in securing the downlink message 215 while also mitigating self-interference 230. UE 115-*a* may be configured to achieve the trade-off based on a jamming signal power scheme. In some implementations, UE 115-*a* may be configured with a self-interference threshold for use in achieving the balance (e.g., in accordance with a jamming signal power scheme). Accordingly, UE 115-*a* may calculate a transmission power using Equation 1 and based on the calculated transmission power, UE 115-*a* may determine a level of self-interference that may result if UE 115-*a* transmitted jamming signal 225 at the calculated transmission power in the same resources UE 115-*a* is attempting to receive a downlink message 215. UE 115-*a* may be configured or may receive an indication (e.g., from base station 105-*a*) of a method of determining the level of self-interference based on the calculated transmission power. For example, UE 115-*a* may use a calibration procedure to estimate the level of self-interference 230 based on the calculated transmission power. Upon determining the level of self-interference 230, UE 115-*a* may compare the estimated level of self-interference 230 to the self-interference threshold.

In accordance with a jamming signal power scheme, if UE 115-*a* determines that the self-interference 230 is below the threshold, UE 115-*a* may transmit the jamming signal 225 at the calculated level of self-interference. In some cases, if UE 115-*a* determines that the self-interference 230 is above a threshold UE 115-*a* may be configured to lower the transmission power by an amount and re-calculate the estimated level of self-interference. If UE 115-*a* again determines that the self-interference 230 is above a threshold UE 115-*a* may be configured to lower the transmission power by an amount, and so on until the estimated level of self-interference 230 is below the self-interference threshold.

In some cases, in accordance with a jamming signal power scheme, if UE 115-*a* determines that the self-interference 230 is greater than the threshold, UE 115-*a* may drop the jamming signal 225. For example, if the estimated level of self-interference is high enough, then UE 115-*a* may refrain from transmitting the jamming signal 225. Accordingly, UE 115-*a* may accept the potential decline in the secrecy rate because UE 115-*a* may receive the downlink message 215 and UE 115-*b* may receive the leakage of the downlink message 215. In some cases, UE 115-*a* may perform such jamming signal power scheme if the contents of the downlink message 215 are associated with a secrecy level below a threshold.

In some cases, in accordance with a jamming signal power scheme, UE 115-*a* may be configured to transmit the jamming signal in accordance with the calculated transmission power regardless of the level of self-interference 230. For example, in some cases, UE 115-*a* may not estimate the level of self-interference at all prior to transmitting the jamming signal 225. In another example, UE 115-*a* may be configured to estimate the level of self-interference 230 but may transmit the jamming signal 225 at the calculated transmission power regardless of the estimated self-interference level (e.g., regardless of whether the estimated self-interference level is less than, equal to, or greater than the self-interference threshold). Accordingly, UE 115-*a* may accept a hit in performance in receiving and decoding the downlink message 215, such as if the estimated self-interference level is high (e.g., greater than the self-interference threshold). UE 115-*a* may be configured to transmit the jamming signal 225 regardless of the level of self-interference for each downlink message 215 (e.g., all the time), or more a particular downlink message 215 or type of downlink message 215. For example, in accordance with a jamming signal power scheme, UE 115-*a* may be configured to transmit the jamming signal 225 regardless of the level of self-interference if the downlink message 215 is associated with a security level greater than a threshold.

In some cases, in accordance with a jamming signal power scheme, UE 115-*a* may be configured with a maximum transmission power for transmitting a jamming signal 225 (e.g., a jamming signal-specific maximum transmission power, $P_{CMAX}$). The maximum transmission power may be configured to limit the level of self-interference caused by a jamming signal 225. In some cases, the maximum transmission power may be configured so that the self-interference level is less than (e.g., always less than) the self-interference threshold. UE 115-*a* may be configured with at least one maximum transmission power for transmitting non-jamming signals, and a maximum transmission power for transmitting jamming signal 225, where the multiple maximum transmission powers may be the same or different.

To calculate the transmission power of the jamming signal 225 in accordance with Equation 1, UE 115-*a* may need the path loss between UE 115-*a* and UE 115-*b* (e.g., PL). In some cases, base station 105-*a* may determine the path loss between UE 115-*a* and UE 115-*b* and may indicate the path loss to UE 115-*a*. For example, UEs 115 may be configured to transmit path loss reference signals in one or more directions (e.g., toward base station 105-*a*, or in multiple directions). Base station 105-*a* may receive one or more path loss reference signals from UE 115-*a* and/or UE 115-*b* and may estimate the path loss between UE 115-*a* and UE 115-*b* based on the one or more path loss reference signals. In some cases, base station 105-*a* may estimate the path loss between UE 115-*a* and UE 115-*b* based on a path loss between UE 115-*a* and base station 105-*a* and UE 115-*b* and base station 105-*a*. In some cases, base station 105-*a* may estimate the path loss between UE 115-*a* and UE 115-*c* based one or more other parameters. For example, if UE 115-*a* and UE 115-*b* each have an established connection with base station 105-*a*, base station 105-*a* may identify information (e.g., power information) associated with each UE 115 and may be able to estimate the power between UE 115-*a* and UE 115-*b* based on the information. Accordingly, base station 105-*a* may then indicate the estimated path loss to at least UE 115-*b*.

In some cases, base station 105-*a* may provide information to UE 115-*a* to enable UE 115-*a* to determine the path loss between UE 115-*a* and UE 115-*b*. For example, if base station 105-*a* is unable to identify the exact (e.g., or near exact) location of UE 115-*a* and/or UE 115-*b*, base station 105-*a* may determine a range of path loss values including a maximum path loss value and minimum path loss value for UE 115-*a* to consider as potential path loss values between UE 115-*a* and UE 115-*b*. In some cases, UE 115-*a* may be configured to start with the maximum path loss value and calculate the transmission power in accordance with Equation 1 based on the maximum path loss value. If the self-interference level associated with the calculated transmission power is greater than the self-interference threshold, then UE 115-*a* may use the next highest path loss included in the range after the maximum path loss value. Again, UE 115-*a* may calculate the transmission power and if the self-interference level associated with the calculated transmission power is greater than the self-interference threshold, then UE 115-*a* may use the next highest path loss included in the range, and so on until the self-interference level is below a threshold. In some cases, UE 115-*b* may be configured to start calculating the transmission power with the lowest path loss value in the range. In some cases, UE 115-*a* may continue calculating the transmission power with the next highest path loss until UE 115-*a* calculates a transmission power associated with a self-interference level that is below (e.g., just below) the self-interference threshold.

In some cases, UE 115-*a* may determine the path loss between UE 115-*a* and UE 115-*a* autonomously. For example, UE 115-*a* may receive one or more path loss reference signals from UE 115-*b*, and UE 115-*a* may use the one or more path loss reference signals to determine the path loss between UE 115-*a* and UE 115-*b*.

In some implementations, UE 115-*a* may determine or receive an indication of a direction to transmit the jamming signal 225. For example, base station 105-*a* may determine the location of UE 115-*b* in relation to UE 115-*a*, and transmit an indication to UE 115-*a* indicating the direction to transmit the jamming signal 225 in, accordingly. In another example, UE 115-*a* may determine the direction to transmit the jamming signal 225, autonomously, based on information about UE 115-*b*. In some implementations, base station 105-*a* may indicate and/or UE 115-*a* may determine multiple directions to transmit the jamming signal 225 in. For example, UE 115-*a* and/or base station 105-*a* may have multiple potential aggressor UEs 115 nearby. Accordingly, UE 115-*a* may transmit the jamming signal 225 in each of the multiple directions or UE 115-*a* may apply a spatial filter to the jamming signal 225 to transmit the jamming signal 225 in the direction of the majority of the aggressor UEs 115.

In some cases, UE 115-*a* may receive, from base station 105-*a* or some other network device, an indication of the jamming signal power scheme to use, and/or parameters associated with the jamming signal power scheme (e.g., self-interference threshold, maximum transmission power). UE 115-*a* may receive the indication aperiodically, semi-statically, dynamically, or a combination thereof (e.g., via RRC, MAC-CE, downlink control information (DCI), respectively). In some cases, UE 115-*a* may receive the indication in the control message 210 that schedules the downlink message 215 being secured (e.g., physical downlink control channel (PDCCH) message), where the indication may be included as one or more bits of the control message 210.

In some cases, UE 115-*a* may be preconfigured with the jamming signal power scheme to use, or UE 115-*a* may autonomously determine (e.g., based on UE 115 implementation) which jamming signal power scheme to use. UE 115-*a* may be configured with a set of jamming signal power schemes and UE 115-*a* may select a jamming signal power scheme from the set to use. In some cases, UE 115-*a* may determine a jamming signal power scheme to use based on a level of self-interference estimated at UE 115-*a*. UE 115-*a* may transmit an indication to base station 105-*a* of the jamming signal power scheme and/or parameters associated with the jamming signal power scheme being used by UE 115-*a*. UE 115-*a* may transmit the indication in an uplink control information (UCI) message, or via some other message (e.g., uplink control message, MAC-CE, RRC).

In some implementations, UE 115-*a* may receive, from base station 105-*a* or some other network device, an indication of a set of parameters associated with a jamming signal power scheme. The set of parameters may include Equation 1, a transmit power control command (TPC), frequency information for the jamming signal 225, spatial information for the jamming signal 225, purpose for secrecy, etc. UE 115-*a* may receive the indication of the set of parameters aperiodically, semi-statically, dynamically, or a combination thereof (e.g., via RRC, MAC-CE, DCI, respectively). In some cases, UE 115-*a* may receive the indication of the set of parameters and/or the jamming signal power scheme to use via RRC signaling when the aggressor UE 115 is stationary (e.g., or relatively unmoving in relation to UE 115-*a*).

In some cases, UE 115-*a* may receive an indication or otherwise be configured with multiple sets of parameters and/or multiple jamming signal power schemes. For example, UE 115-*a* may receive an RRC message including the multiple sets of parameters and/or multiple jamming signal power schemes. UE 115-*a* may subsequently determine which set of parameters and/or which jamming signal power scheme to use from the multiple sets. In some cases, UE 115-*a* may receive an indication, from base station 105-*a*, of which set of parameters and/or which jamming signal power scheme to use from the multiple sets. UE 115-*a* may receive the indication via DCI (e.g., RRC configuration of the multiple sets followed by DCI activation of the set of the multiple sets).

Accordingly, the described techniques may support improvements in securing communications between devices (e.g., UE 115-*a* and base station 115-*a*) by balancing the security with self-interference at UE 115-*a*. The described techniques may support improved reliability, and improved performance of a full-duplex device, among other advantages.

Figure 3:
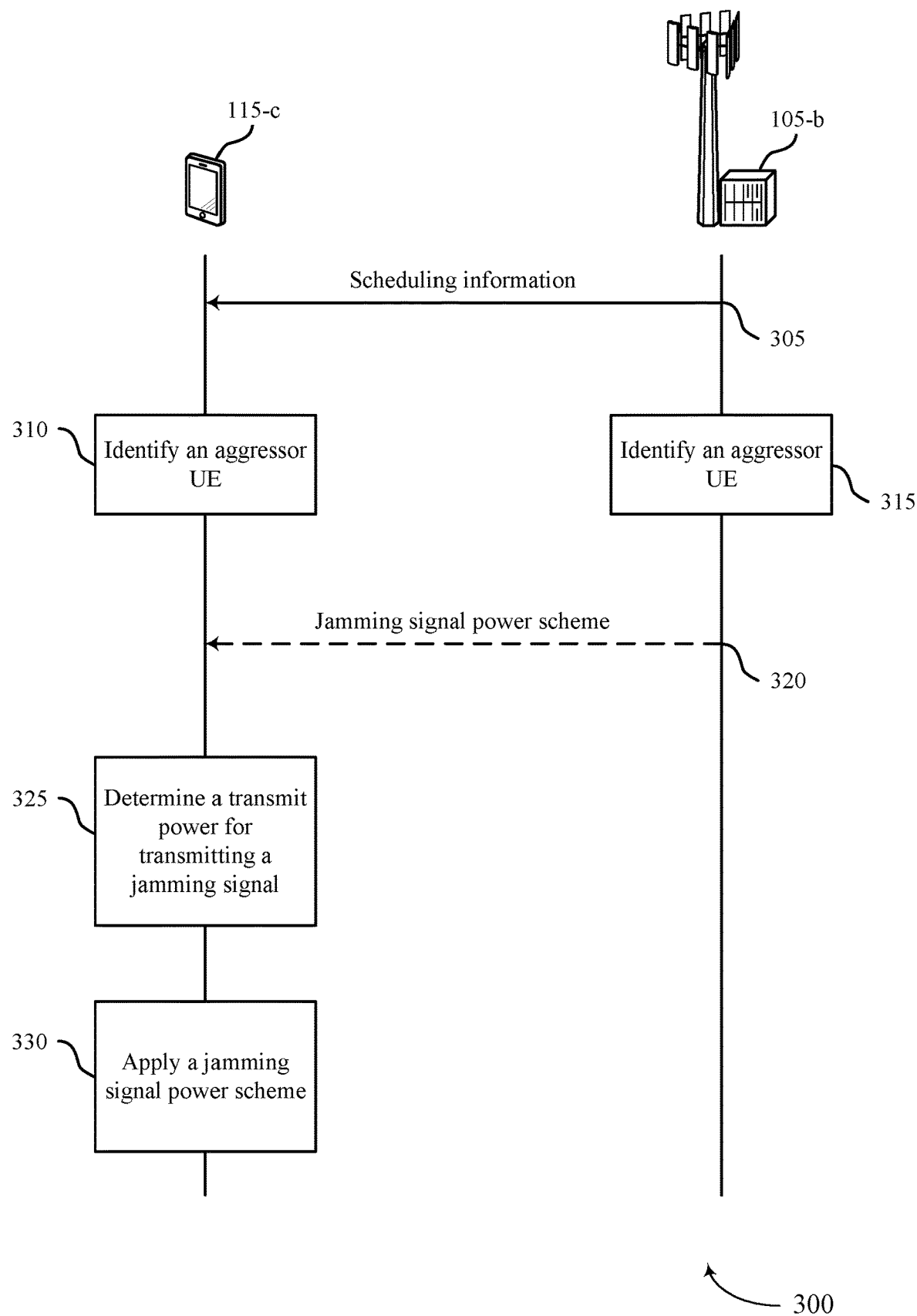
FIG. 3 illustrates an example of a process flow that supports techniques for performing physical layer security during full-duplex communications in accordance with aspects of the present disclosure.

FIG. 3 illustrates an example of a process flow 300 that supports techniques for performing physical layer security during full-duplex communications in accordance with aspects of the present disclosure. The process flow 300 may illustrate an example power determination procedure for a jamming signal power. For example, UE 115-*c* may determine a transmission power and apply a jamming signal power scheme to the jamming signal to secure communications with base station 105-*b*. Base station 105-*b* and UE 115-*c* may be examples of the corresponding wireless devices described with reference to FIGS. 1 and 2. In some cases, instead of UE 115-*c* implementing the jamming signal power determination procedure, a different type of device (e.g., a base station 105) may perform the same or a similar procedure. Alternative examples of the following may be implemented, where some steps are performed in a different order than described or are not performed at all. In some cases, steps may include additional features not mentioned below, or further steps may be added.

At 305, UE 115-*c* may receive, from base station 105-*b*, a control signal scheduling UE 115-*c* to receive a downlink message from base station 105-*b* using a set of time and frequency resources. At 310, UE 115-*c* may identify an aggressor UE 115 in between (e.g., an aggressor UE 115 attempting to receive uplink communications, downlink communications, or both, transmitted between) UE 115-*c* and base station 105-*b*. Identifying the aggressor UE 115 may include receiving a signal from the base station 105 including at least one of a direction to the aggressor UE 115 or an estimated path between UE 115-*c* and the aggressor UE 115.

At 315, base station 105-*b* may identify an aggressor UE 115 in a communications range of the (e.g., an aggressor UE 115 attempting to receive uplink communications, downlink communications, or both, transmitted between) UE 115-*c* and base station 105-*b*.

At 320, base station 105-*b* may transmit an indication of a jamming signal power scheme to use by UE 115-*b* for transmitting, during the set of time and frequency resources, a jamming signal to the aggressor UE 115.

At 325, UE 115-*c* may determine a transmit power for transmitting a jamming signal to the aggressor UE 115 during the set of time and frequency resources. UE 115-*c* may be configured with a procedure for determining the level of self-interference based at least in part on the transmit power. In some cases, UE 115-*c* may receive, from base station 105-*b*, an indication of a range of potential path loss values, where the range may include a minimum potential path loss and a maximum potential path loss between UE 115-*c* and the aggressor UE 115. UE 115-*c* may determine the transmit power for transmitting the jamming signal based at least in part on the maximum potential path loss. UE 115-*c* may determine the transmit power for transmitting the jamming signal using a next potential path loss in the range after the maximum potential path loss based at least in part on determining that the level of self-interference associated with using the maximum potential path loss is greater than the self-interference threshold.

UE 115-*c* may receive an indication of a maximum transmission power for transmitting jamming signals, wherein determining a transmit power may be based at least in part on the maximum transmission power. In some cases, UE 115-*c* may receive, from base station 105-*c*, an indication of a path loss between UE 115-*c* and the aggressor UE 115, wherein determining the transmit power may be based at least in part on the path loss.

At 330, UE 115-*c* may apply a jamming signal power scheme to the jamming signal by either using the determined transmit power or adjusting the determined transmit power in accordance with the jamming signal power scheme. UE 115-*c* may determine a level of self-interference associated with transmitting the jamming signal with the transmit power, and compare the level of self-interference to a self-interference threshold. Applying the jamming signal power scheme may include reducing the transmit power for the jamming signal based at least in part on determining that the level of self-interference is greater than the self-interference threshold. Applying the jamming signal power scheme may include refraining from transmitting the jamming signal based at least in part on determining that the level of self-interference is greater than the self-interference threshold. Applying the jamming signal power scheme may include transmitting the jamming signal using the transmit power based at least in part on determining that the level of self-interference is greater than, equal to, or less than the self-interference threshold.

UE 115-*c* may receive, from base station 105-*b*, an indication of a direction to transmit the jamming signal, wherein applying the jamming signal power scheme may include transmitting the jamming signal in the direction indicated by base station 105-*b*. In some implementations, UE 115-*c* may receive, from base station 105-*b*, an indication of multiple directions to transmit the jamming signal, where the multiple directions may be based on multiple aggressor UEs 115. UE 115-*c* may apply a spatial filter to transmit the jamming signal, wherein the spatial filter may be selected based at least in part on transmitting the jamming signal in a direction of a majority of the multiple aggressor UEs 115.

In some cases, UE 115-c may receive an indication (e.g., from base station 105-b) of the jamming signal power scheme to use, where the indication may be included in a RRC message, or a DCI message, or both. UE 115-c may receive an indication of a set of parameters to use for the jamming signal power scheme. The set of parameters may include time resources, frequency resources, spatial information, a transmit power control equation, or a combination thereof. Receiving the indication of the set of parameters may include receiving a RRC message, or a DCI message, or both comprising the indication of the set of parameters. Determining the transmit power may be based at least in part on the set of parameters.

In some cases, UE 115-c may receive a plurality of sets of parameters associated with the jamming signal, where each set of parameters may be received via a RRC message, and UE 115-c may receive a message indicating a set of parameters of the plurality of sets of parameters to use for the jamming signal power scheme. The message may be a DCI message. Determining the transmit power may be based at least in part on the set of parameters.

In some implementations, UE 115-c may transmit, to base station 105-b, an indication of the jamming signal power scheme being used by UE 115-c to transmit the jamming signal, where the indication may be included in an uplink control information message.

Figure 4:
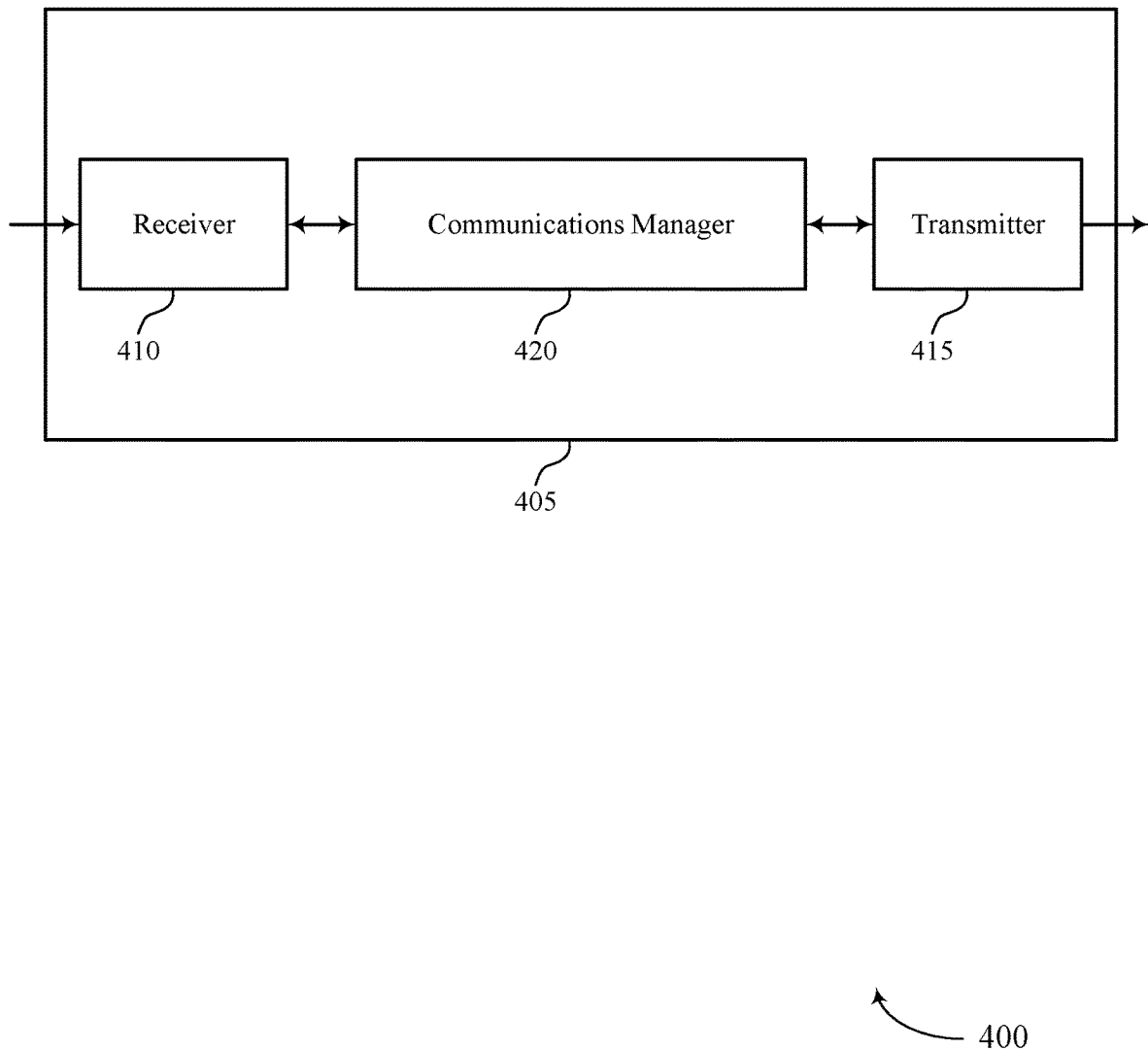
FIGS. 4 and 5 show block diagrams of devices that support techniques for performing physical layer security during full-duplex communications in accordance with aspects of the present disclosure.

FIG. 4 shows a block diagram 400 of a device 405 that supports techniques for performing physical layer security during full-duplex communications in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for performing physical layer security during full-duplex communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for performing physical layer security during full-duplex communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for performing physical layer security during full-duplex communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, a control signal scheduling the UE to receive a downlink message from the base station using a set of time and frequency resources. The communications manager 420 may be configured as or otherwise support a means for identifying an aggressor UE in between a communication range of the UE and the base station. The communications manager 420 may be configured as or otherwise support a means for determining a transmit power for transmitting a jamming signal during the set of time and frequency resources. The communications manager 420 may be configured as or otherwise support a means for applying a jamming signal power scheme to the jamming signal by either using the determined transmit power or adjusting the determined transmit power in accordance with the jamming signal power scheme.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources.

Figure 5:
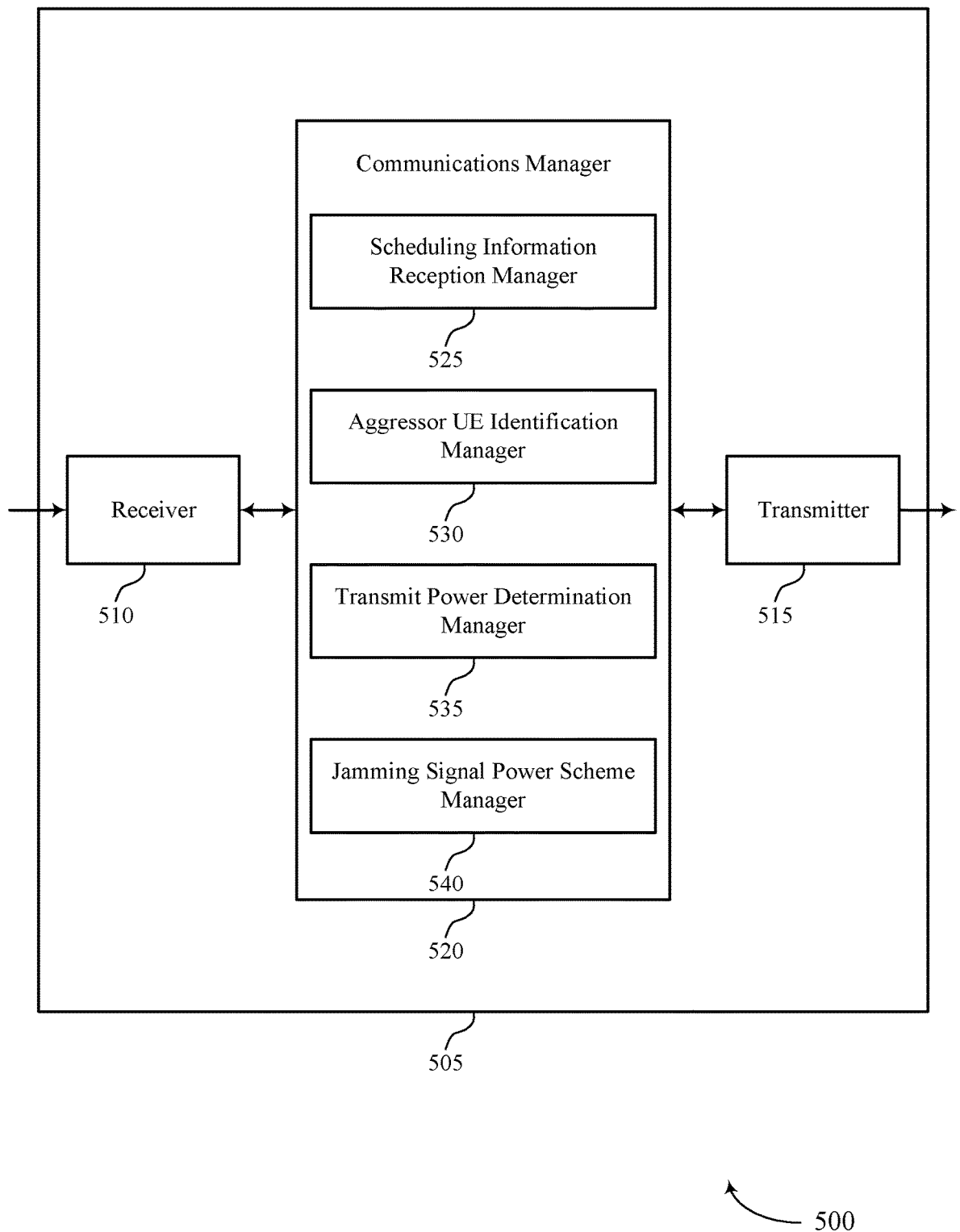

FIG. 5 shows a block diagram 500 of a device 505 that supports techniques for performing physical layer security during full-duplex communications in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for performing physical layer security during full-duplex communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for performing physical layer security during full-duplex communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for performing physical layer security during full-duplex communications as described herein. For example, the communications manager 520 may include a scheduling information reception manager 525, an aggressor UE identification manager 530, a transmit power determination manager 535, a jamming signal power scheme manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The scheduling information reception manager 525 may be configured as or otherwise support a means for receiving, from a base station, a control signal scheduling the UE to receive a downlink message from the base station using a set of time and frequency resources. The aggressor UE identification manager 530 may be configured as or otherwise support a means for identifying an aggressor UE in between a communication range of the UE and the base station. The transmit power determination manager 535 may be configured as or otherwise support a means for determining a transmit power for transmitting a jamming signal during the set of time and frequency resources. The jamming signal power scheme manager 540 may be configured as or otherwise support a means for applying a jamming signal power scheme to the jamming signal by either using the determined transmit power or adjusting the determined transmit power in accordance with the jamming signal power scheme.

Figure 6:
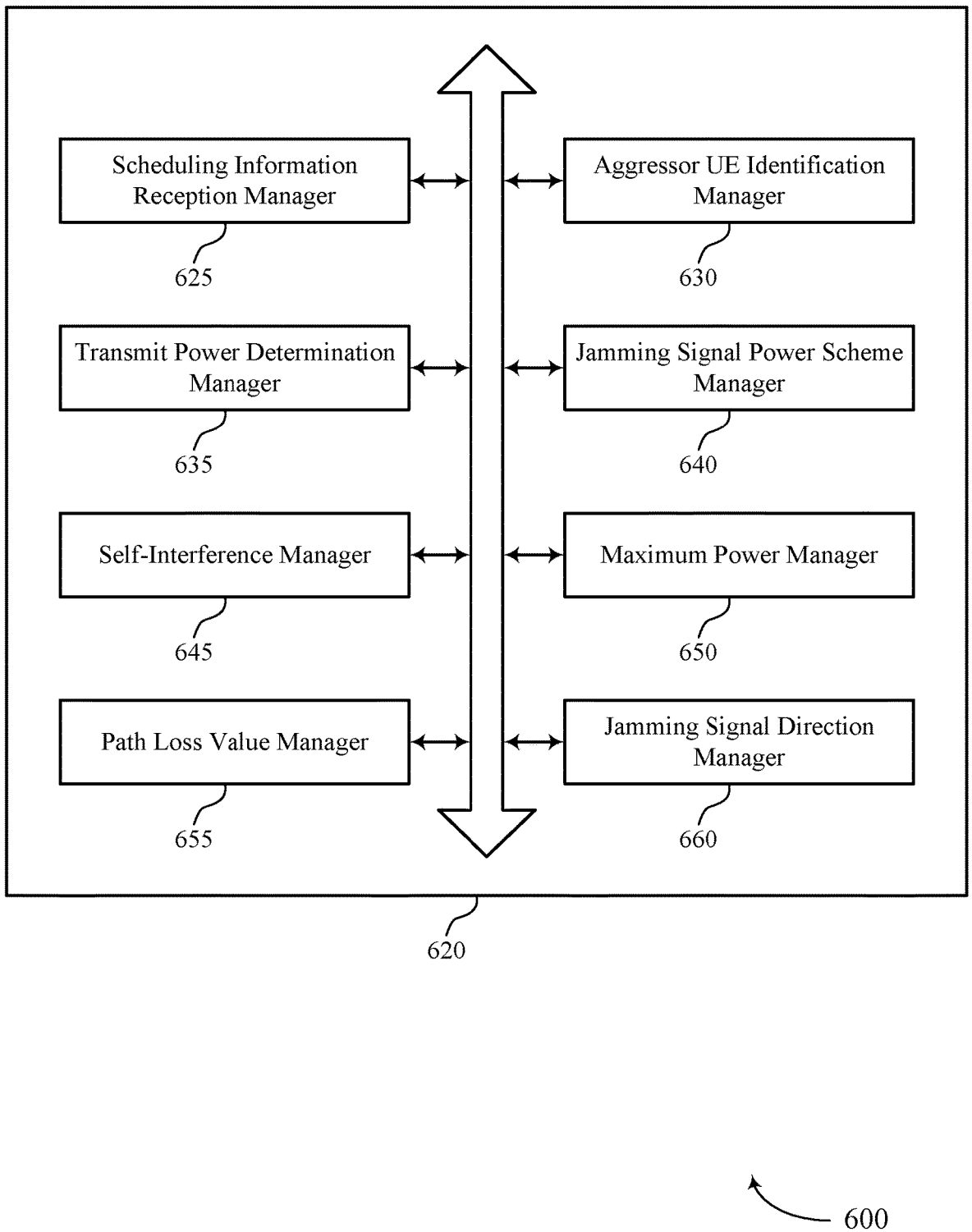
FIG. 6 shows a block diagram of a communications manager that supports techniques for performing physical layer security during full-duplex communications in accordance with aspects of the present disclosure.

FIG. 6 shows a block diagram 600 of a communications manager 620 that supports techniques for performing physical layer security during full-duplex communications in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for performing physical layer security during full-duplex communications as described herein. For example, the communications manager 620 may include a scheduling information reception manager 625, an aggressor UE identification manager 630, a transmit power determination manager 635, a jamming signal power scheme manager 640, a self-interference manager 645, a maximum power manager 650, a path loss value manager 655, a jamming signal direction manager 660, or any combination thereof. Each of these components may communicate, directly or indirectly, with one another (e.g., via one or more buses).

The communications manager 620 may support wireless communications at a UE in accordance with examples as disclosed herein. The scheduling information reception manager 625 may be configured as or otherwise support a means for receiving, from a base station, a control signal scheduling the UE to receive a downlink message from the base station using a set of time and frequency resources. The aggressor UE identification manager 630 may be configured as or otherwise support a means for identifying an aggressor UE in between a communication range of the UE and the base station. The transmit power determination manager 635 may be configured as or otherwise support a means for determining a transmit power for transmitting a jamming signal during the set of time and frequency resources. The jamming signal power scheme manager 640 may be configured as or otherwise support a means for applying a jamming signal power scheme to the jamming signal by either using the determined transmit power or adjusting the determined transmit power in accordance with the jamming signal power scheme.

In some examples, the aggressor UE identification manager 630 may be configured as or otherwise support a means for receiving a signal from the base station comprising at least one of a direction to the aggressor UE or an estimated path between the UE and the aggressor UE.

In some examples, the self-interference manager 645 may be configured as or otherwise support a means for determining a level of self-interference associated with transmitting the jamming signal with the transmit power. In some examples, the self-interference manager 645 may be configured as or otherwise support a means for comparing the level of self-interference to a self-interference threshold.

In some examples, to support applying the jamming signal power scheme, the jamming signal power scheme manager 640 may be configured as or otherwise support a means for reducing the transmit power for the jamming signal based on determining that the level of self-interference is greater than the self-interference threshold.

In some examples, to support applying the jamming signal power scheme, the jamming signal power scheme manager 640 may be configured as or otherwise support a means for refraining from transmitting the jamming signal based on determining that the level of self-interference is greater than the self-interference threshold.

In some examples, to support applying the jamming signal power scheme, the jamming signal power scheme manager 640 may be configured as or otherwise support a means for transmitting the jamming signal using the transmit power based on determining that the level of self-interference is greater than, equal to, or less than the self-interference threshold.

In some examples, the path loss value manager 655 may be configured as or otherwise support a means for receiving, from the base station, an indication of a range of potential path loss values, the range including a minimum potential path loss and a maximum potential path loss between the UE and the aggressor UE. In some examples, the transmit power determination manager 635 may be configured as or otherwise support a means for determining the transmit power for transmitting the jamming signal based on the maximum potential path loss.

In some examples, the transmit power determination manager 635 may be configured as or otherwise support a means for determining the transmit power for transmitting the jamming signal using a next lower potential path loss in the range after the maximum potential path loss based on determining that the level of self-interference associated with using the maximum potential path loss to determine the transmit power is greater than the self-interference threshold.

In some examples, the UE is configured with a procedure for determining the level of self-interference based on the transmit power.

In some examples, the maximum power manager 650 may be configured as or otherwise support a means for receiving an indication of a maximum transmission power for transmitting jamming signals, where determining a transmit power is based on the maximum transmission power.

In some examples, the path loss value manager 655 may be configured as or otherwise support a means for receiving, from the base station, an indication of a path loss between the UE and the aggressor UE, where determining the transmit power is based on the path loss.

In some examples, the jamming signal direction manager 660 may be configured as or otherwise support a means for receiving, from the base station, an indication of a direction to transmit the jamming signal, where applying the jamming signal power scheme includes transmitting the jamming signal in the direction indicated by the base station.

In some examples, the jamming signal direction manager 660 may be configured as or otherwise support a means for receiving, from the base station, an indication of multiple directions to transmit the jamming signal, the multiple directions based on multiple aggressor UEs. In some examples, the jamming signal direction manager 660 may be configured as or otherwise support a means for applying a spatial filter to transmit the jamming signal, where the spatial filter is selected based on transmitting the jamming signal in a direction of a majority of the multiple aggressor UEs.

In some examples, the jamming signal power scheme manager 640 may be configured as or otherwise support a means for receiving an indication of the jamming signal power scheme to use, the indication included in a RRC message, or a DCI message, or both.

In some examples, the jamming signal power scheme manager 640 may be configured as or otherwise support a means for transmitting, to the base station, an indication of the jamming signal power scheme being used by the UE to transmit the jamming signal, the indication included in an uplink control information message.

In some examples, the jamming signal power scheme manager 640 may be configured as or otherwise support a means for receiving an indication of a set of parameters to use for the jamming signal power scheme, the set of parameters including time resources, frequency resources, spatial information, a transmit power control equation, or a combination thereof, where determining the transmit power is based on the set of parameters.

In some examples, to support receiving the indication of the set of parameters, the jamming signal power scheme manager 640 may be configured as or otherwise support a means for receiving a RRC message, or a DCI message, or both including the indication of the set of parameters.

In some examples, the jamming signal power scheme manager 640 may be configured as or otherwise support a means for receiving a set of multiple sets of parameters associated with the jamming signal, each set of parameters received via a RRC message. In some examples, the jamming signal power scheme manager 640 may be configured as or otherwise support a means for receiving a message indicating a set of parameters of the set of multiple sets of parameters to use for the jamming signal power scheme, the message is a DCI message, where determining the transmit power is based on the set of parameters.

Figure 7:
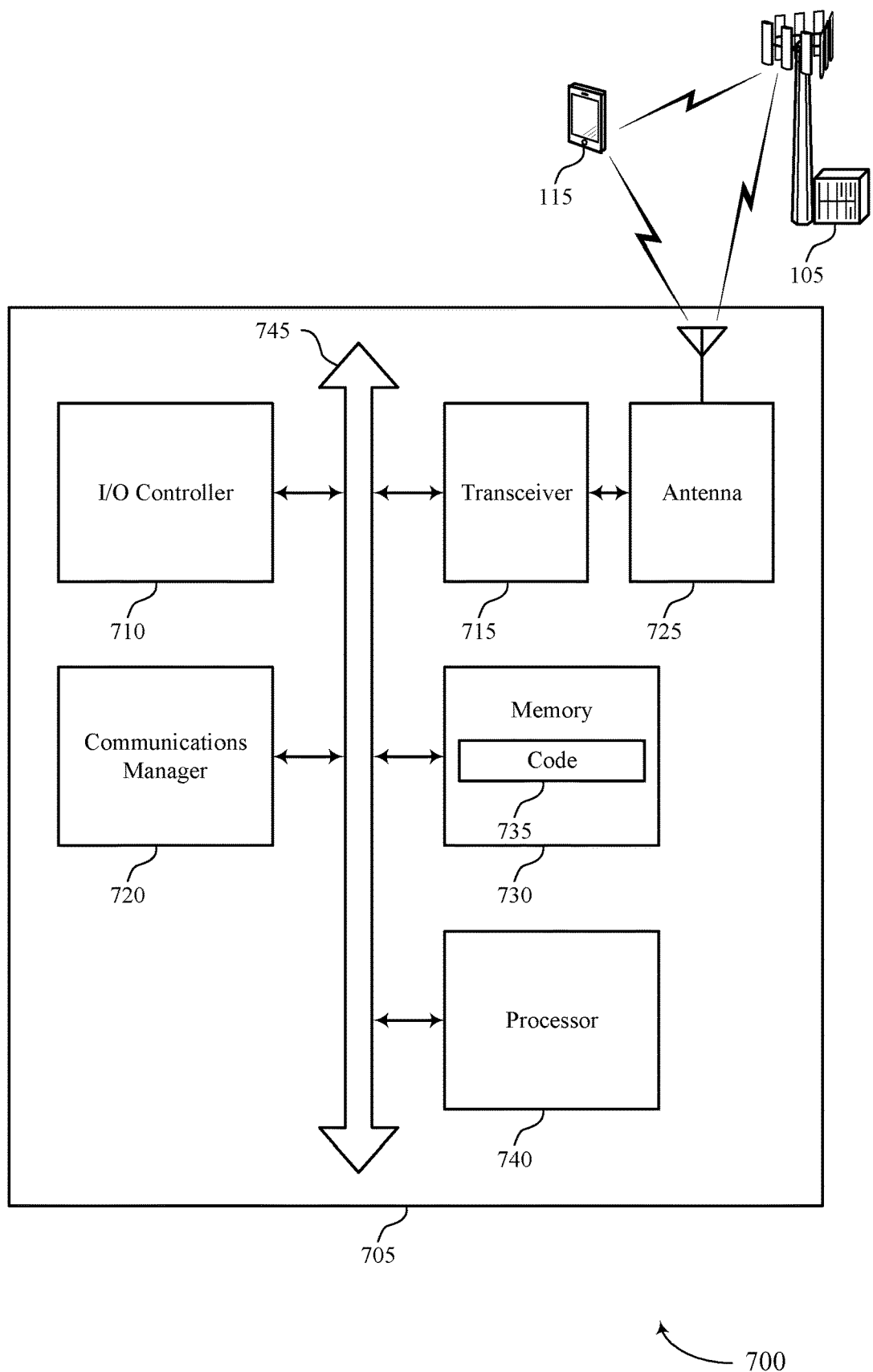
FIG. 7 shows a diagram of a system including a device that supports techniques for performing physical layer security during full-duplex communications in accordance with aspects of the present disclosure.

FIG. 7 shows a diagram of a system 700 including a device 705 that supports techniques for performing physical layer security during full-duplex communications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for performing physical layer security during full-duplex communications). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, a control signal scheduling the UE to receive a downlink message from the base station using a set of time and frequency resources. The communications manager 720 may be configured as or otherwise support a means for identifying an aggressor UE in between a communication range of the UE and the base station. The communications manager 720 may be configured as or otherwise support a means for determining a transmit power for transmitting a jamming signal to the aggressor UE during the set of time and frequency resources. The communications manager 720 may be configured as or otherwise support a means for applying a jamming signal power scheme to the jamming signal by either using the determined transmit power or adjusting the determined transmit power in accordance with the jamming signal power scheme.

By including or configuring the communications manager 720 in accordance with examples as described herein, the device 705 may support techniques for improved communication reliability, more efficient utilization of communication resources, improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for performing physical layer security during full-duplex communications as described herein, or the processor 740 and the memory 730 may be otherwise configured to perform or support such operations.

Figure 8:
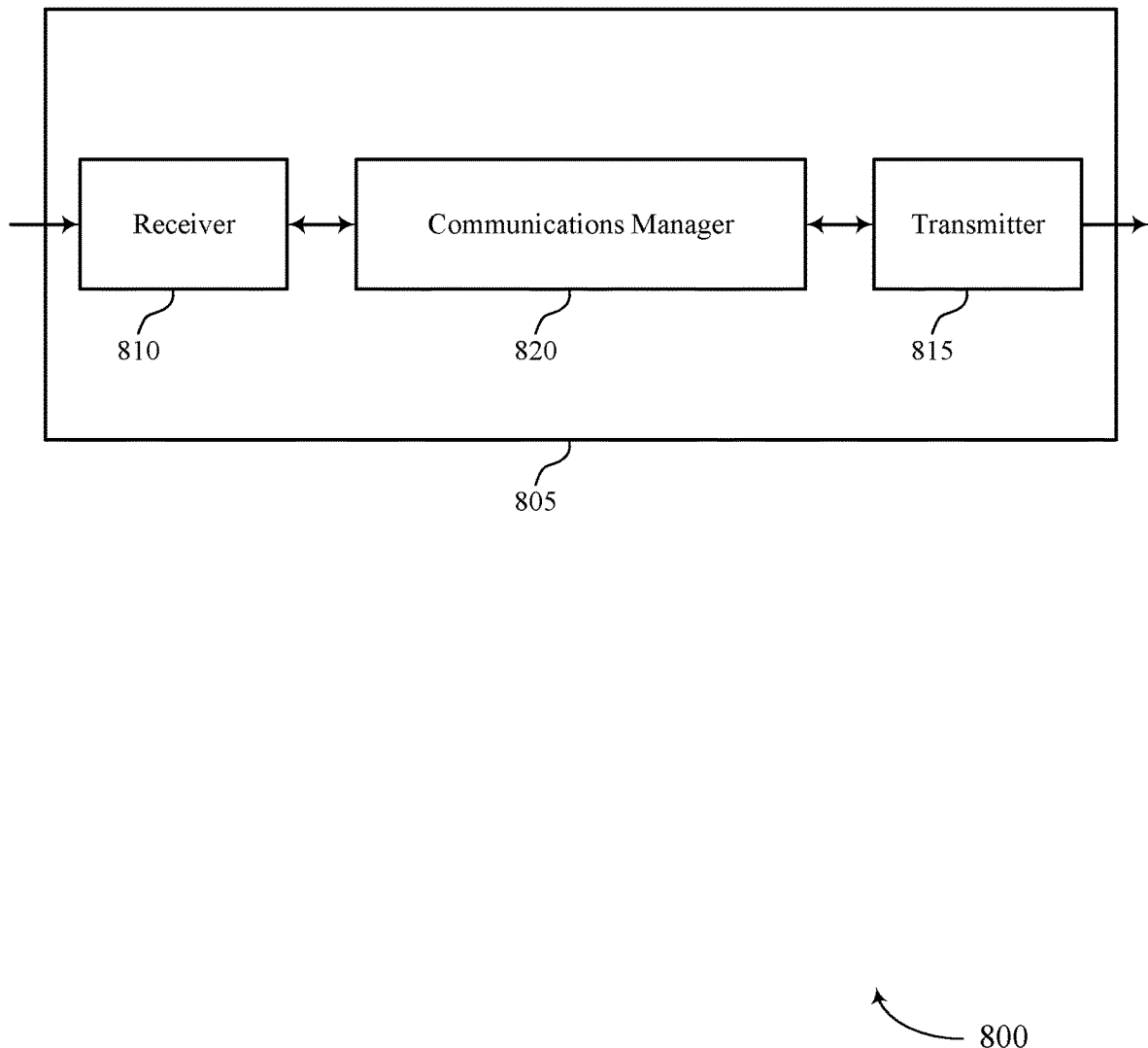
FIGS. 8 and 9 show block diagrams of devices that support techniques for performing physical layer security during full-duplex communications in accordance with aspects of the present disclosure.

FIG. 8 shows a block diagram 800 of a device 805 that supports techniques for performing physical layer security during full-duplex communications in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for performing physical layer security during full-duplex communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for performing physical layer security during full-duplex communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for performing physical layer security during full-duplex communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure.

In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, a control signal scheduling the UE to receive a downlink message from the base station using a set of time and frequency resources. The communications manager 820 may be configured as or otherwise support a means for identifying an aggressor UE in a communications range of the UE and the base station. The communications manager 820 may be configured as or otherwise support a means for transmitting an indication of a jamming signal power scheme to use by the UE for transmitting, during the set of time and frequency resources, a jamming signal.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources.

Figure 9:
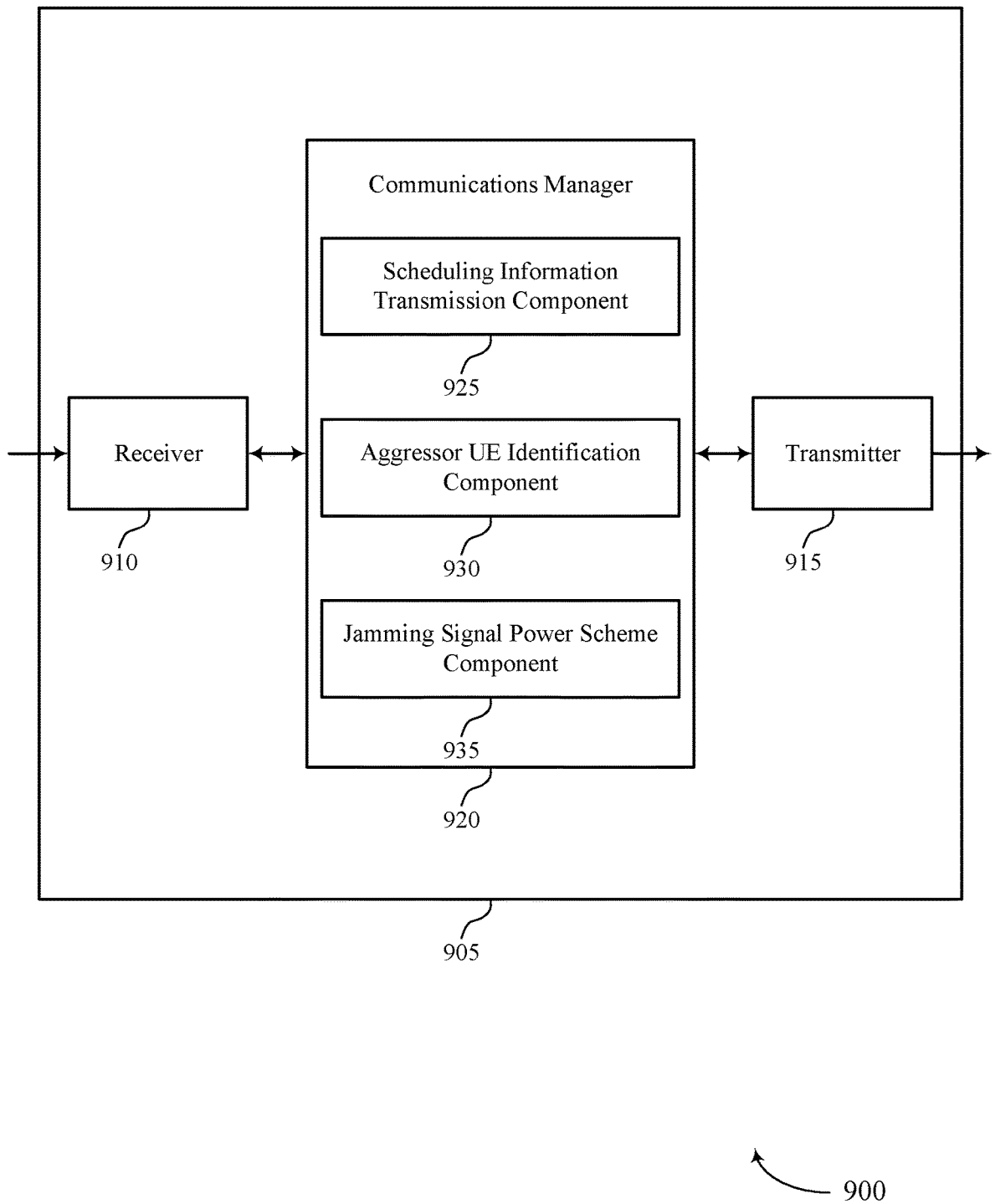

FIG. 9 shows a block diagram 900 of a device 905 that supports techniques for performing physical layer security during full-duplex communications in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for performing physical layer security during full-duplex communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for performing physical layer security during full-duplex communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for performing physical layer security during full-duplex communications as described herein. For example, the communications manager 920 may include a scheduling information transmission component 925, an aggressor UE identification component 930, a jamming signal power scheme component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The scheduling information transmission component 925 may be configured as or otherwise support a means for transmitting, to a UE, a control signal scheduling the UE to receive a downlink message from the base station using a set of time and frequency resources. The aggressor UE identification component 930 may be configured as or otherwise support a means for identifying an aggressor UE in a communications range of the UE and the base station. The jamming signal power scheme component 935 may be configured as or otherwise support a means for transmitting an indication of a jamming signal power scheme to use by the UE for transmitting, during the set of time and frequency resources, a jamming signal.

Figure 10:
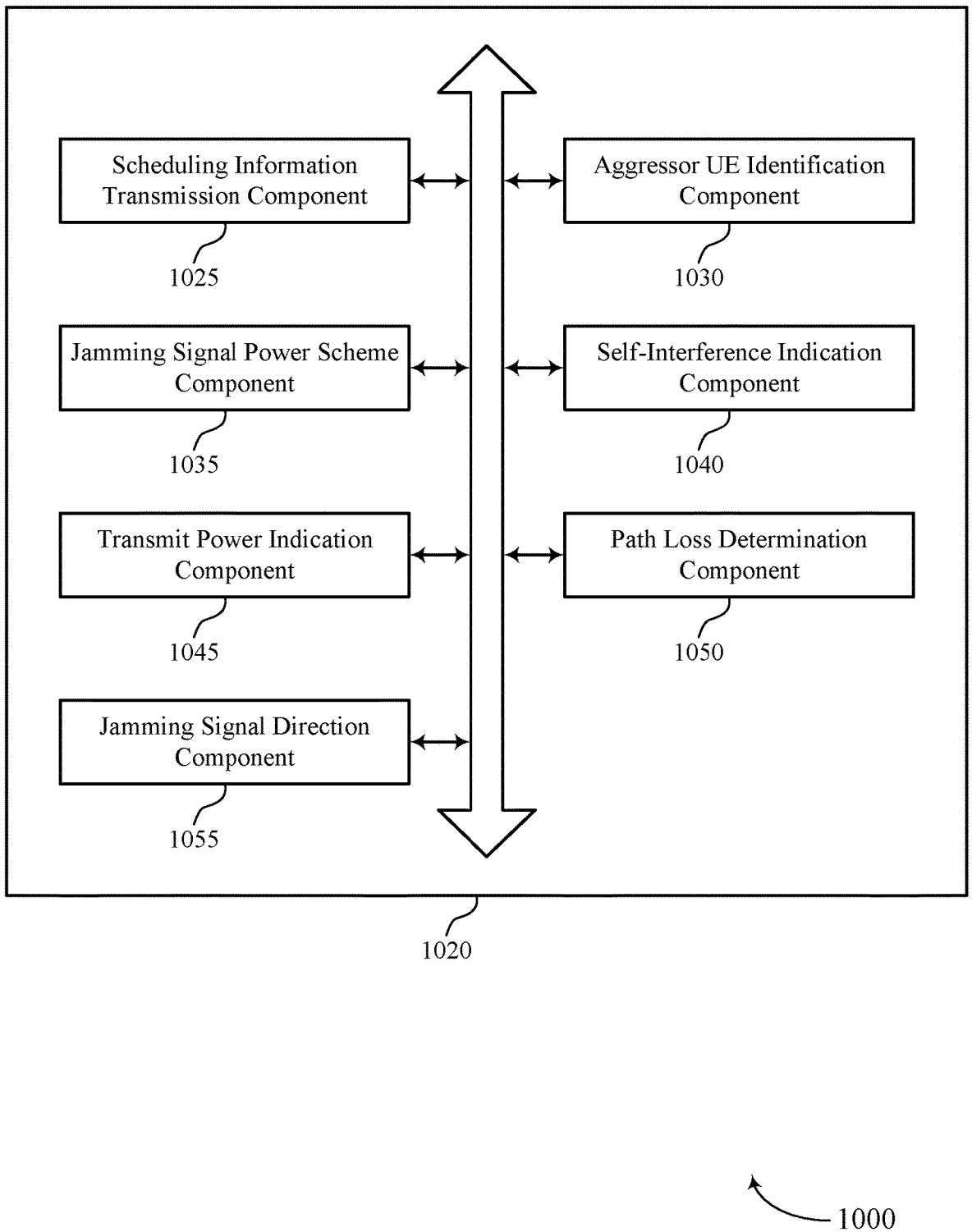
FIG. 10 shows a block diagram of a communications manager that supports techniques for performing physical layer security during full-duplex communications in accordance with aspects of the present disclosure.

FIG. 10 shows a block diagram 1000 of a communications manager 1020 that supports techniques for performing physical layer security during full-duplex communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for performing physical layer security during full-duplex communications as described herein. For example, the communications manager 1020 may include a scheduling information transmission component 1025, an aggressor UE identification component 1030, a jamming signal power scheme component 1035, a self-interference indication component 1040, a transmit power indication component 1045, a path loss determination component 1050, a jamming signal direction component 1055, or any combination thereof. Each of these components may communicate, directly or indirectly, with one another (e.g., via one or more buses).

The communications manager 1020 may support wireless communications at a base station in accordance with examples as disclosed herein. The scheduling information transmission component 1025 may be configured as or otherwise support a means for transmitting, to a UE, a control signal scheduling the UE to receive a downlink message from the base station using a set of time and frequency resources. The aggressor UE identification component 1030 may be configured as or otherwise support a means for identifying an aggressor UE in a communications range of the UE and the base station. The jamming signal power scheme component 1035 may be configured as or otherwise support a means for transmitting an indication of a jamming signal power scheme to use by the UE for transmitting, during the set of time and frequency resources, a jamming signal.

In some examples, to support transmitting the indication of the jamming signal power scheme, the self-interference indication component 1040 may be configured as or otherwise support a means for transmitting a message indicating the UE to determine a level of self-interference associated with transmitting the jamming signal in accordance with a transmit power and to compare the level of self-interference to a self-interference threshold.

In some examples, to support transmitting the message, the transmit power indication component 1045 may be configured as or otherwise support a means for transmitting the message indicating the UE to reduce the transmit power for the jamming signal if the level of self-interference is greater than the self-interference threshold.

In some examples, to support transmitting the message, the transmit power indication component 1045 may be configured as or otherwise support a means for transmitting the message indicating the UE to refrain from transmitting the jamming signal if the level of self-interference is greater than the self-interference threshold.

In some examples, to support transmitting the message, the transmit power indication component 1045 may be configured as or otherwise support a means for transmitting the message indicating the UE to transmit the jamming signal using the transmit power if the level of self-interference is greater than, equal to, or less than the self-interference threshold.

In some examples, the path loss determination component 1050 may be configured as or otherwise support a means for receiving one or more path loss reference signals from the aggressor UE and the UE. In some examples, the path loss determination component 1050 may be configured as or otherwise support a means for transmitting, to the UE, a signal indicating a range of potential path loss values based on the one or more path loss reference signals received from the aggressor UE and the UE, the range including a minimum potential path loss and a maximum potential path loss between the UE and the aggressor UE.

In some examples, to support transmitting the indication of the jamming signal power scheme, the transmit power indication component 1045 may be configured as or otherwise support a means for transmitting a second signal indicating the UE to determine the transmit power for transmitting the jamming signal starting with the maximum potential path loss, then using a next lower potential path loss in the range after the maximum potential path loss if the level of self-interference associated with using the maximum potential path loss is greater than the self-interference threshold.

In some examples, the self-interference indication component 1040 may be configured as or otherwise support a means for transmitting, to the UE, a signal indicating a procedure for determining the level of self-interference based on the transmit power.

In some examples, the transmit power indication component 1045 may be configured as or otherwise support a means for transmitting a message indicating a maximum transmission power for transmitting jamming signals by the UE.

In some examples, the path loss determination component 1050 may be configured as or otherwise support a means for receiving one or more path loss reference signals from the aggressor UE and the UE. In some examples, the path loss determination component 1050 may be configured as or otherwise support a means for transmitting, to the UE, a message indicating a path loss between the UE and the aggressor UE based on the one or more path loss reference signals received from the aggressor UE and the UE.

In some examples, to support transmitting the indication of the jamming signal power scheme, the jamming signal direction component 1055 may be configured as or otherwise support a means for transmitting, to the UE, a message indicating a direction to transmit the jamming signal.

In some examples, to support transmitting the indication of the jamming signal power scheme, the jamming signal direction component 1055 may be configured as or otherwise support a means for transmitting, to the UE, a first message indicating multiple directions to transmit the jamming signal, the multiple directions based on multiple aggressor UEs. In some examples, to support transmitting the indication of the jamming signal power scheme, the jamming signal direction component 1055 may be configured as or otherwise support a means for transmitting a second message indicating the UE to select a spatial filter for transmitting the jamming signal in a direction of a majority of the multiple aggressor UEs.

In some examples, to support transmitting the indication of the jamming signal power scheme, the jamming signal power scheme component 1035 may be configured as or otherwise support a means for transmitting a RRC message, or a DCI message, or both, including the indication of the jamming signal power scheme.

In some examples, the jamming signal power scheme component 1035 may be configured as or otherwise support a means for receiving, from the UE, a signal indicating the jamming signal power scheme being used by the UE to transmit the jamming signal, the indication included in an uplink control information message.

In some examples, the jamming signal power scheme component 1035 may be configured as or otherwise support a means for transmitting, to the UE, a message indicating a set of parameters to use for the jamming signal power scheme, the set of parameters including time resources, frequency resources, spatial information, a transmit power control equation, or a combination thereof.

In some examples, to support transmitting the message, the jamming signal power scheme component 1035 may be configured as or otherwise support a means for transmitting a RRC message, or a DCI message, or both including the set of parameters.

In some examples, the jamming signal power scheme component 1035 may be configured as or otherwise support a means for transmitting a set of multiple sets of parameters associated with the jamming signal, each set of parameters transmitted via a RRC message. In some examples, the jamming signal power scheme component 1035 may be configured as or otherwise support a means for transmitting a message indicating a set of parameters of the set of multiple sets of parameters to use for the jamming signal power scheme, where the message is a DCI message.

Figure 11:
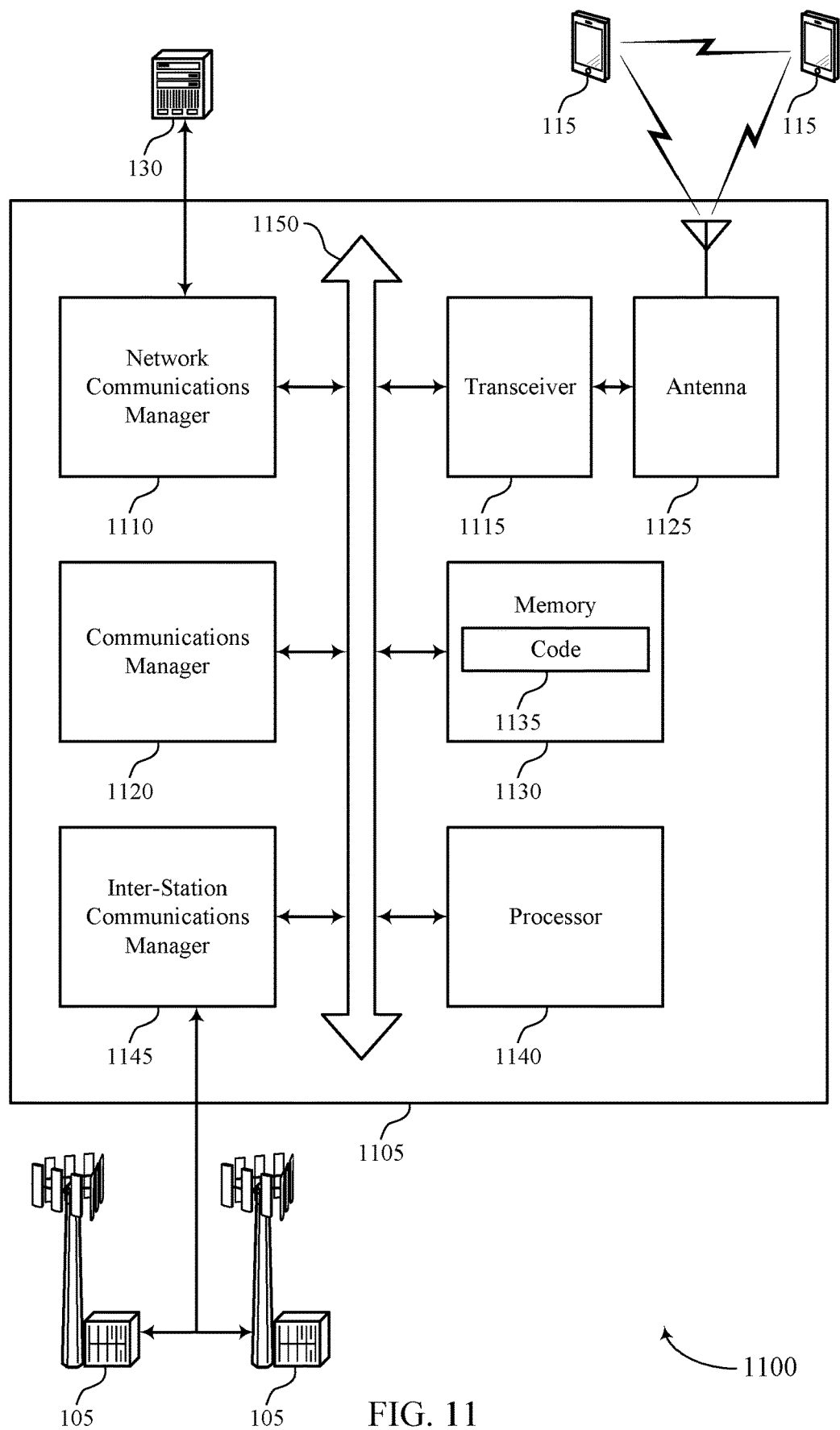
FIG. 11 shows a diagram of a system including a device that supports techniques for performing physical layer security during full-duplex communications in accordance with aspects of the present disclosure.

FIG. 11 shows a diagram of a system 1100 including a device 1105 that supports techniques for performing physical layer security during full-duplex communications in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for performing physical layer security during full-duplex communications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, a control signal scheduling the UE to receive a downlink message from the base station using a set of time and frequency resources. The communications manager 1120 may be configured as or otherwise support a means for identifying an aggressor UE in a communications range of the UE and the base station. The communications manager 1120 may be configured as or otherwise support a means for transmitting an indication of a jamming signal power scheme to use by the UE for transmitting, during the set of time and frequency resources, a jamming signal.

By including or configuring the communications manager 1120 in accordance with examples as described herein, the device 1105 may support techniques for improved communication reliability, more efficient utilization of communication resources, improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for performing physical layer security during full-duplex communications as described herein, or the processor 1140 and the memory 1130 may be otherwise configured to perform or support such operations.

Figure 12:
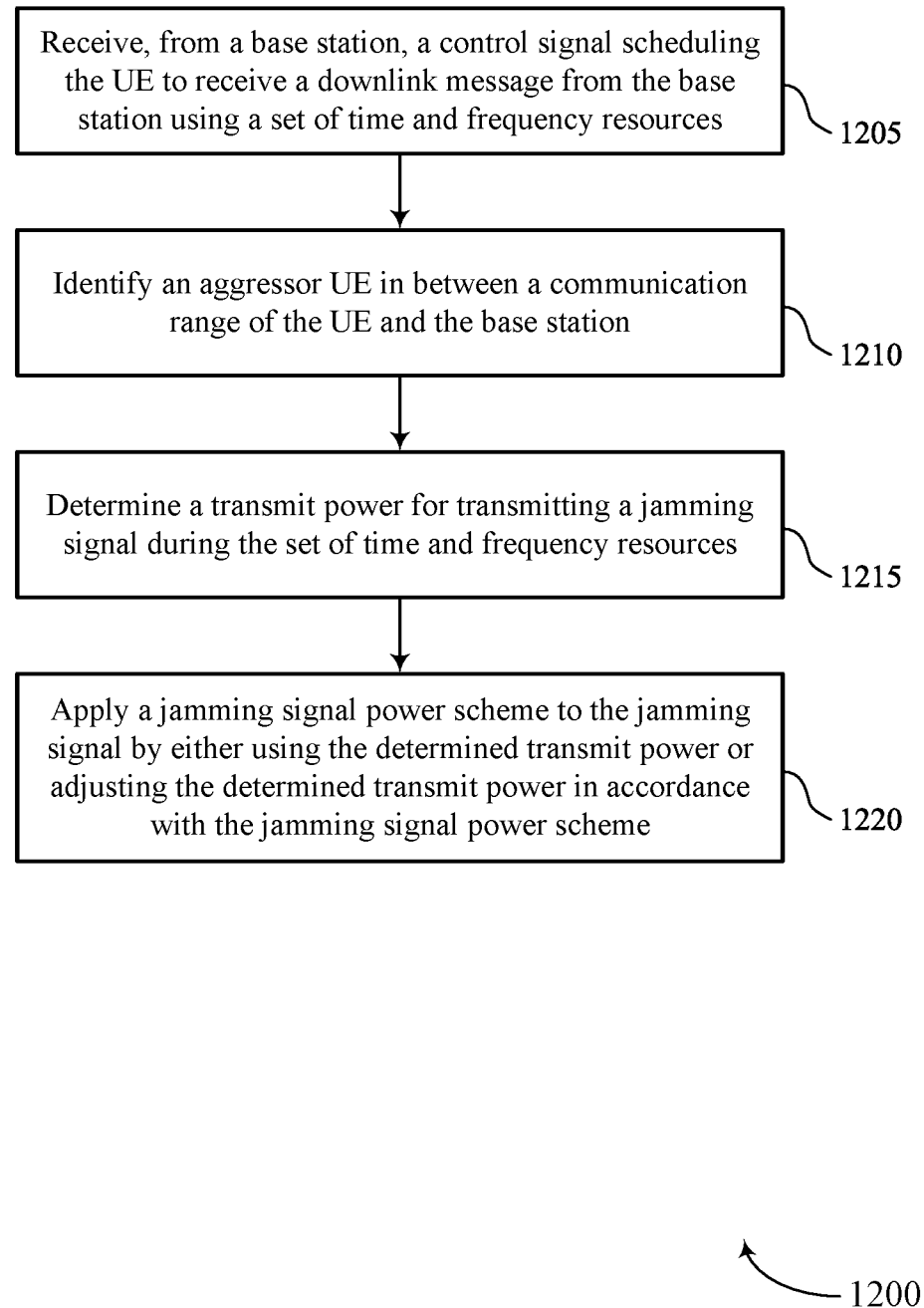
FIGS. 12 through 15 show flowcharts illustrating methods that support techniques for performing physical layer security during full-duplex communications in accordance with aspects of the present disclosure.

FIG. 12 shows a flowchart illustrating a method 1200 that supports techniques for performing physical layer security during full-duplex communications in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a control signal scheduling the UE to receive a downlink message from the base station using a set of time and frequency resources. The operations of 1205 may be performed in accordance with examples as disclosed herein. In some examples, aspects of the operations of 1205 may be performed by a scheduling information reception manager 625 as described with reference to FIG. 6.

At 1210, the method may include identifying an aggressor UE in between a communication range of the UE and the base station. The operations of 1210 may be performed in accordance with examples as disclosed herein. In some examples, aspects of the operations of 1210 may be performed by an aggressor UE identification manager 630 as described with reference to FIG. 6.

At 1215, the method may include determining a transmit power for transmitting a jamming signal during the set of time and frequency resources. The operations of 1215 may be performed in accordance with examples as disclosed herein. In some examples, aspects of the operations of 1215 may be performed by a transmit power determination manager 635 as described with reference to FIG. 6.

At 1220, the method may include applying a jamming signal power scheme to the jamming signal by either using the determined transmit power or adjusting the determined transmit power in accordance with the jamming signal power scheme. The operations of 1220 may be performed in accordance with examples as disclosed herein. In some examples, aspects of the operations of 1220 may be performed by a jamming signal power scheme manager 640 as described with reference to FIG. 6.

Figure 13:
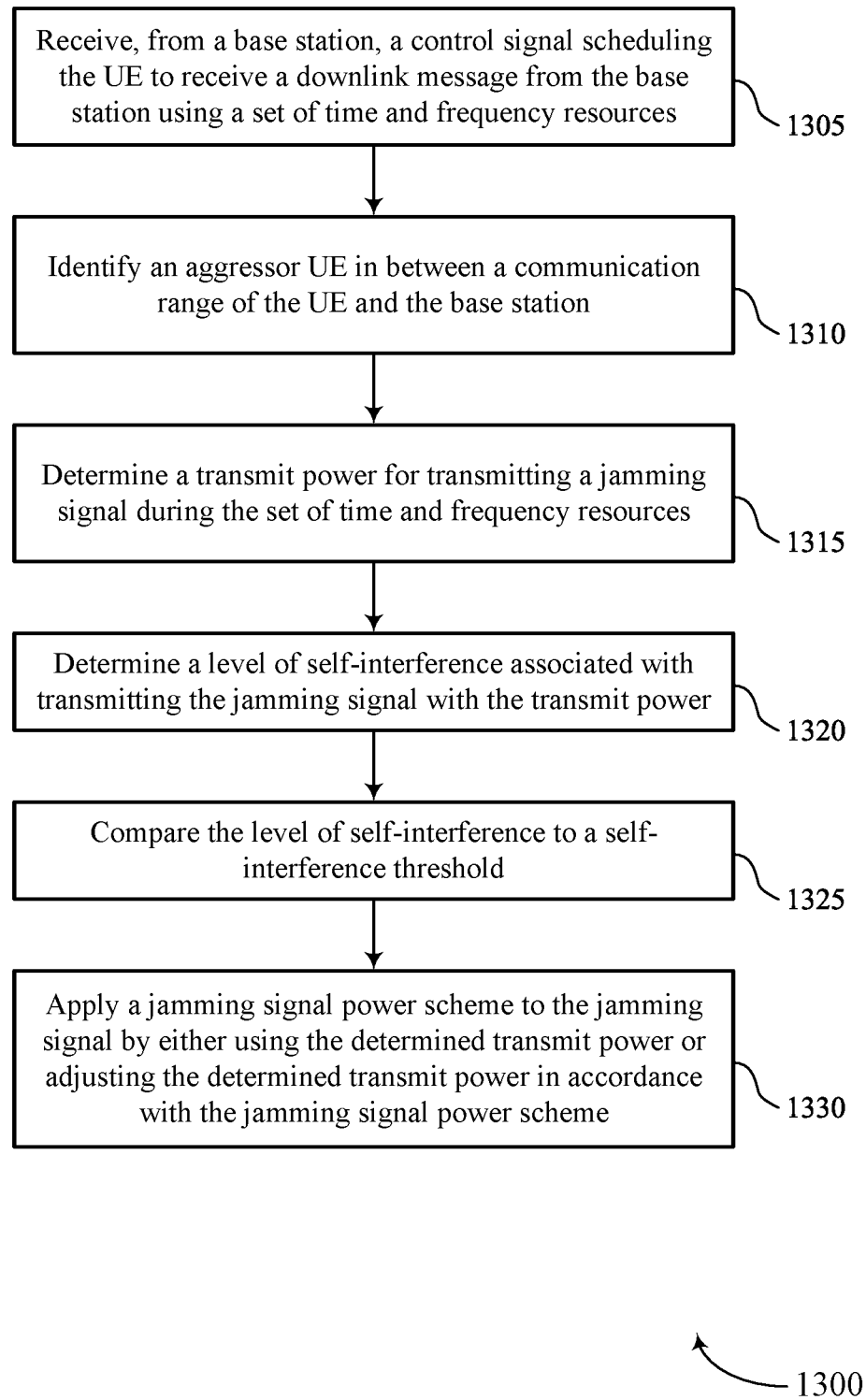

FIG. 13 shows a flowchart illustrating a method 1300 that supports techniques for performing physical layer security during full-duplex communications in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a control signal scheduling the UE to receive a downlink message from the base station using a set of time and frequency resources. The operations of 1305 may be performed in accordance with examples as disclosed herein. In some examples, aspects of the operations of 1305 may be performed by a scheduling information reception manager 625 as described with reference to FIG. 6.

At 1310, the method may include identifying an aggressor UE in between a communication range of the UE and the base station. The operations of 1310 may be performed in accordance with examples as disclosed herein. In some examples, aspects of the operations of 1310 may be performed by an aggressor UE identification manager 630 as described with reference to FIG. 6.

At 1315, the method may include determining a transmit power for transmitting a jamming signal during the set of time and frequency resources. The operations of 1315 may be performed in accordance with examples as disclosed herein. In some examples, aspects of the operations of 1315 may be performed by a transmit power determination manager 635 as described with reference to FIG. 6.

At 1320, the method may include determining a level of self-interference associated with transmitting the jamming signal with the transmit power. The operations of 1320 may be performed in accordance with examples as disclosed herein. In some examples, aspects of the operations of 1320 may be performed by a self-interference manager 645 as described with reference to FIG. 6.

At 1325, the method may include comparing the level of self-interference to a self-interference threshold. The operations of 1325 may be performed in accordance with examples as disclosed herein. In some examples, aspects of the operations of 1325 may be performed by a self-interference manager 645 as described with reference to FIG. 6.

At 1330, the method may include applying a jamming signal power scheme to the jamming signal by either using the determined transmit power or adjusting the determined transmit power in accordance with the jamming signal power scheme. The operations of 1330 may be performed in accordance with examples as disclosed herein. In some examples, aspects of the operations of 1330 may be performed by a jamming signal power scheme manager 640 as described with reference to FIG. 6.

Figure 14:
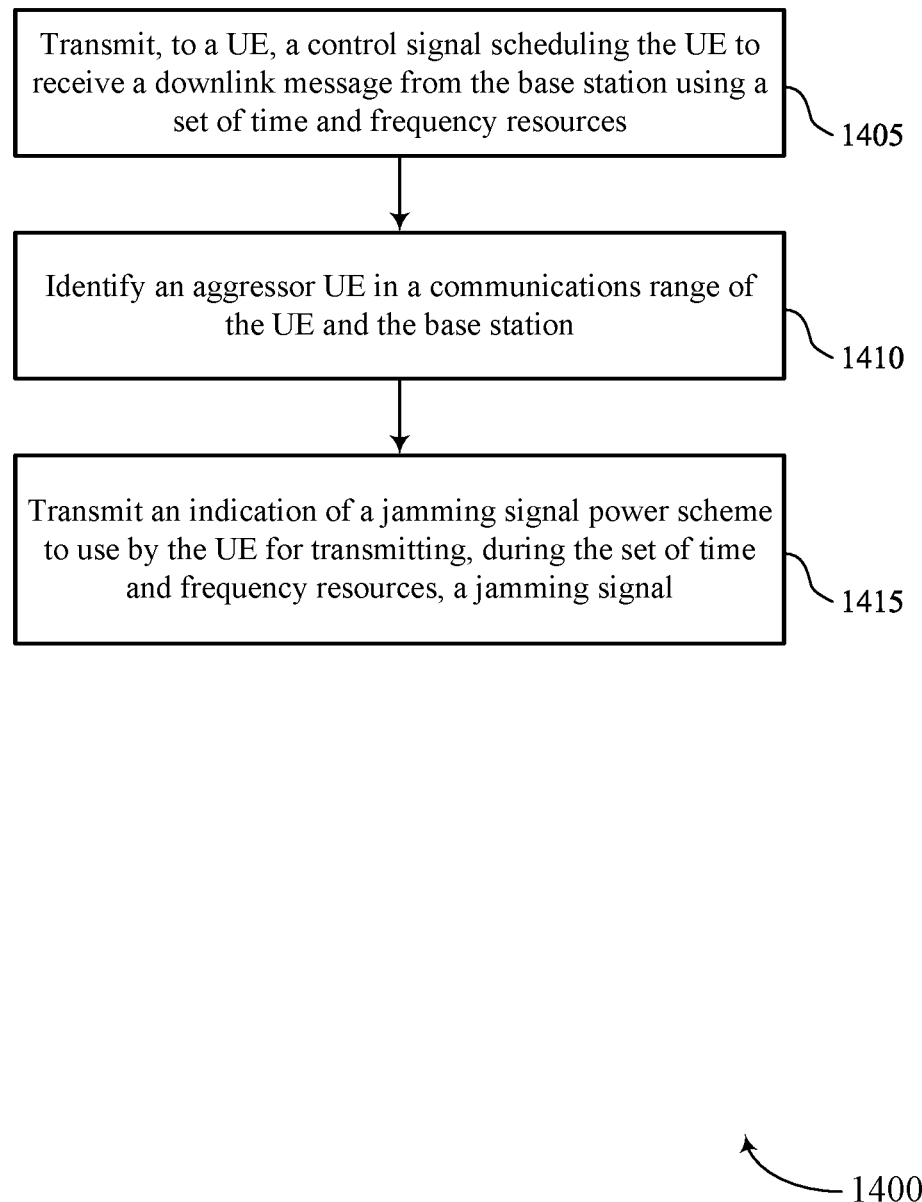

FIG. 14 shows a flowchart illustrating a method 1400 that supports techniques for performing physical layer security during full-duplex communications in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, a control signal scheduling the UE to receive a downlink message from the base station using a set of time and frequency resources. The operations of 1405 may be performed in accordance with examples as disclosed herein. In some examples, aspects of the operations of 1405 may be performed by a scheduling information transmission component 1025 as described with reference to FIG. 10.

At 1410, the method may include identifying an aggressor UE in between a communication range of the UE and the base station. The operations of 1410 may be performed in accordance with examples as disclosed herein. In some examples, aspects of the operations of 1410 may be performed by an aggressor UE identification component 1030 as described with reference to FIG. 10.

At 1415, the method may include transmitting an indication of a jamming signal power scheme to use by the UE for transmitting, during the set of time and frequency resources, a jamming signal. The operations of 1415 may be performed in accordance with examples as disclosed herein. In some examples, aspects of the operations of 1415 may be performed by a jamming signal power scheme component 1035 as described with reference to FIG. 10.

Figure 15:
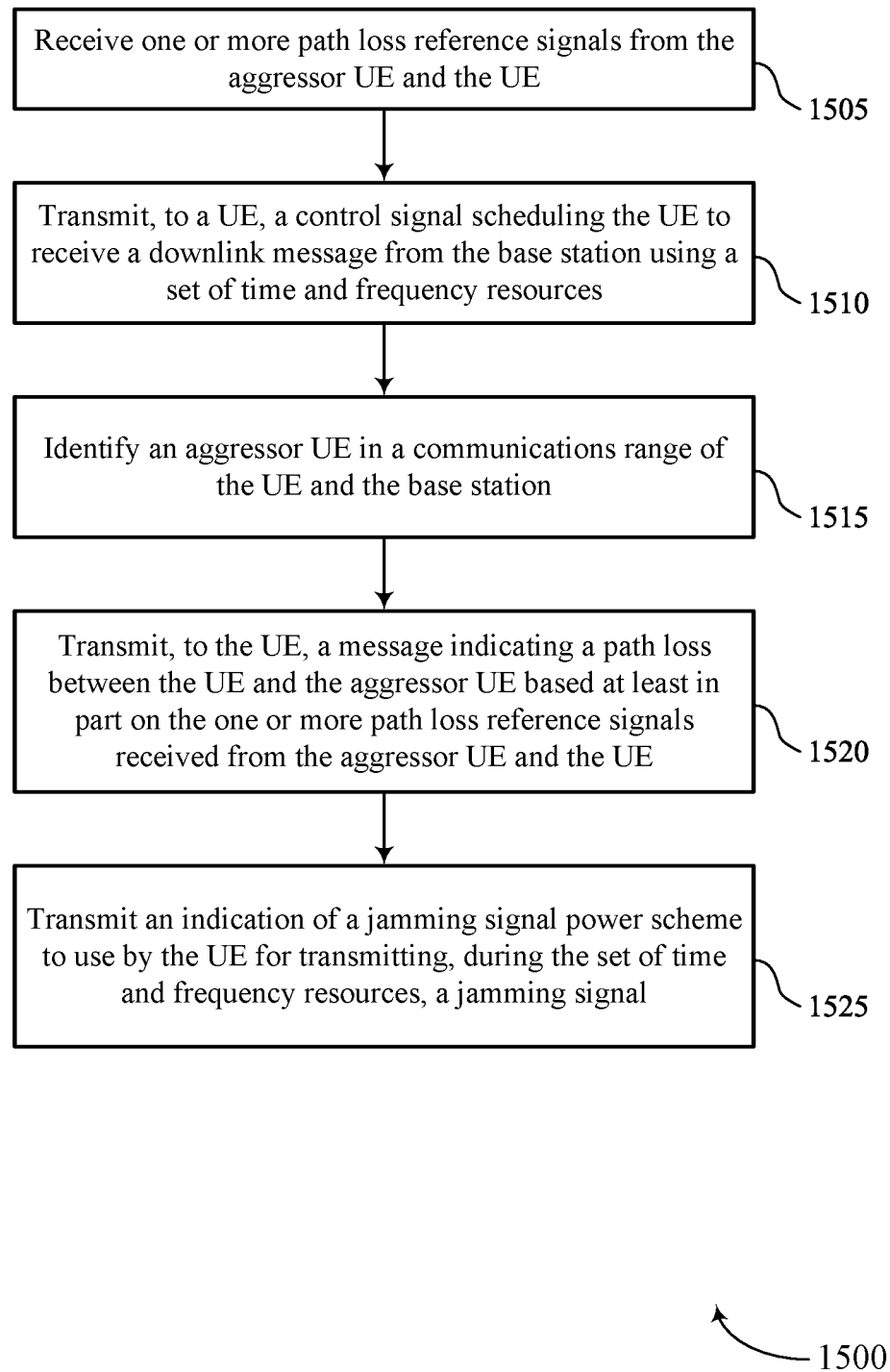

FIG. 15 shows a flowchart illustrating a method 1500 that supports techniques for performing physical layer security during full-duplex communications in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving one or more path loss reference signals from the aggressor UE and the UE. The operations of 1505 may be performed in accordance with examples as disclosed herein. In some examples, aspects of the operations of 1505 may be performed by a path loss determination component 1050 as described with reference to FIG. 10.

At 1510, the method may include transmitting, to a UE, a control signal scheduling the UE to receive a downlink message from the base station using a set of time and frequency resources. The operations of 1510 may be performed in accordance with examples as disclosed herein. In some examples, aspects of the operations of 1510 may be performed by a scheduling information transmission component 1025 as described with reference to FIG. 10.

At 1515, the method may include identifying an aggressor UE in between a communication range of the UE and the base station. The operations of 1515 may be performed in accordance with examples as disclosed herein. In some examples, aspects of the operations of 1515 may be performed by an aggressor UE identification component 1030 as described with reference to FIG. 10.

At 1520, the method may include transmitting, to the UE, a message indicating a path loss between the UE and the aggressor UE based on the one or more path loss reference signals received from the aggressor UE and the UE. The operations of 1520 may be performed in accordance with examples as disclosed herein. In some examples, aspects of the operations of 1520 may be performed by a path loss determination component 1050 as described with reference to FIG. 10.

At 1525, the method may include transmitting an indication of a jamming signal power scheme to use by the UE for transmitting, during the set of time and frequency resources, a jamming signal. The operations of 1525 may be performed in accordance with examples as disclosed herein. In some examples, aspects of the operations of 1525 may be performed by a jamming signal power scheme component 1035 as described with reference to FIG. 10.

The following provides an overview of aspects of the present disclosure:

Aspect 1: A method for wireless communications at a UE, comprising: receiving, from a base station, a control signal scheduling the UE to receive a downlink message from the base station using a set of time and frequency resources; identifying an aggressor UE in between a communication range of the UE and the base station; determining a transmit power for transmitting a jamming signal during the set of time and frequency resources; and applying a jamming signal power scheme to the jamming signal by either using the determined transmit power or adjusting the determined transmit power in accordance with the jamming signal power scheme.

Aspect 2: The method of aspect 1, wherein identifying the aggressor UE further comprises: receiving a signal from the base station comprising at least one of a direction to the aggressor UE or an estimated path between the UE and the aggressor UE.

Aspect 3: The method of aspect 1, further comprising: determining a level of self-interference associated with transmitting the jamming signal with the transmit power Aspect 4: The method of aspect 3, wherein applying the jamming signal power scheme further comprises: reducing the transmit power for the jamming signal based at least in part on determining that the level of self-interference is greater than a self-interference threshold.

Aspect 5: The method of any of aspects 3 through 4, wherein applying the jamming signal power scheme further comprises: refraining from transmitting the jamming signal based at least in part on determining that the level of self-interference is greater than a self-interference threshold.

Aspect 6: The method of any of aspects 3 through 5, wherein applying the jamming signal power scheme further comprises: transmitting the jamming signal using the transmit power based at least in part on determining the level of self-interference.

Aspect 7: The method of any of aspects 3 through 6, further comprising: receiving, from the base station, an indication of a range of potential path loss values, the range comprising a minimum potential path loss and a maximum potential path loss between the UE and the aggressor UE; and determining the transmit power for transmitting the jamming signal based at least in part on the maximum potential path loss.

Aspect 8: The method of aspect 7, further comprising: determining the transmit power for transmitting the jamming signal using a next lower potential path loss in the range after the maximum potential path loss based at least in part on determining that the level of self-interference associated with using the maximum potential path loss to determine the transmit power is greater than a self-interference threshold.

Aspect 9: The method of any of aspects 3 through 8, wherein the UE is configured with a procedure for determining the level of self-interference based at least in part on the transmit power.

Aspect 10: The method of any of aspects 1 through 9, further comprising: receiving an indication of a maximum transmission power for transmitting jamming signals, wherein determining a transmit power is based at least in part on the maximum transmission power.

Aspect 11: The method of any of aspects 1 through 10, further comprising: receiving, from the base station, an indication of a path loss between the UE and the aggressor UE, wherein determining the transmit power is based at least in part on the path loss.

Aspect 12: The method of any of aspects 1 through 11, further comprising: receiving, from the base station, an indication of a direction to transmit the jamming signal, wherein applying the jamming signal power scheme comprises transmitting the jamming signal in the direction indicated by the base station.

Aspect 13: The method of any of aspects 1 through 12, further comprising: receiving, from the base station, an indication of multiple directions to transmit the jamming signal, the multiple directions based at least in part on multiple aggressor UEs; and applying a spatial filter to transmit the jamming signal, wherein the spatial filter is selected based at least in part on transmitting the jamming signal in a direction of a majority of the multiple aggressor UEs.

Aspect 14: The method of any of aspects 1 through 13, further comprising: receiving an indication of the jamming signal power scheme to use, the indication included in a radio resource control message, or a downlink control information message, or both.

Aspect 15: The method of any of aspects 1 through 14, further comprising: transmitting, to the base station, an indication of the jamming signal power scheme being used by the UE to transmit the jamming signal, the indication included in an uplink control information message.

Aspect 16: The method of any of aspects 1 through 15, further comprising: receiving an indication of a set of parameters to use for the jamming signal power scheme, the set of parameters comprising time resources, frequency resources, spatial information, a transmit power control equation, or a combination thereof, wherein determining the transmit power is based at least in part on the set of parameters.

Aspect 17: The method of aspect 16, wherein receiving the indication of the set of parameters further comprises: receiving a radio resource control message, or a downlink control information message, or both comprising the indication of the set of parameters.

Aspect 18: The method of any of aspects 1 through 17, further comprising: receiving a plurality of sets of parameters associated with the jamming signal, each set of parameters received via a radio resource control message; and receiving a message indicating a set of parameters of the plurality of sets of parameters to use for the jamming signal power scheme, the message is a downlink control information message, wherein determining the transmit power is based at least in part on the set of parameters.

Aspect 19: A method for wireless communications at a base station, comprising: transmitting, to a UE, a control signal scheduling the UE to receive a downlink message from the base station using a set of time and frequency resources; identifying an aggressor UE in a communications range of the UE and the base station; and transmitting an indication of a jamming signal power scheme to use by the UE for transmitting, during the set of time and frequency resources, a jamming signal.

Aspect 20: The method of aspect 19, wherein transmitting the indication of the jamming signal power scheme further comprises: transmitting a message indicating the UE to determine a level of self-interference associated with transmitting the jamming signal in accordance with a transmit power and to compare the level of self-interference to a self-interference threshold.

Aspect 21: The method of aspect 20, wherein transmitting the message further comprises: transmitting the message indicating the UE to reduce the transmit power for the jamming signal if the level of self-interference is greater than the self-interference threshold.

Aspect 22: The method of any of aspects 20 through 21, wherein transmitting the message further comprises: transmitting the message indicating the UE to refrain from transmitting the jamming signal if the level of self-interference is greater than the self-interference threshold.

Aspect 23: The method of any of aspects 20 through 22, wherein transmitting the message further comprises: transmitting the message indicating the UE to transmit the jamming signal using the transmit power based on the self-interference threshold.

Aspect 24: The method of any of aspects 20 through 23, further comprising: receiving one or more path loss reference signals from the aggressor UE and the UE; and transmitting, to the UE, a signal indicating a range of potential path loss values based at least in part on the one or more path loss reference signals received from the aggressor UE and the UE, the range comprising a minimum potential path loss and a maximum potential path loss between the UE and the aggressor UE.

Aspect 25: The method of aspect 24, wherein transmitting the indication of the jamming signal power scheme further comprises: transmitting a second signal indicating the UE to determine the transmit power for transmitting the jamming signal starting with the maximum potential path loss, then using a next lower potential path loss in the range after the maximum potential path loss if the level of self-interference associated with using the maximum potential path loss is greater than the self-interference threshold.

Aspect 26: The method of any of aspects 20 through 25, further comprising: transmitting, to the UE, a signal indicating a procedure for determining the level of self-interference based at least in part on the transmit power.

Aspect 27: The method of any of aspects 19 through 26, further comprising: transmitting a message indicating a maximum transmission power for transmitting jamming signals by the UE.

Aspect 28: The method of any of aspects 19 through 27, further comprising: receiving one or more path loss reference signals from the aggressor UE and the UE; and transmitting, to the UE, a message indicating a path loss between the UE and the aggressor UE based at least in part on the one or more path loss reference signals received from the aggressor UE and the UE.

Aspect 29: The method of any of aspects 19 through 28, wherein transmitting the indication of the jamming signal power scheme further comprises: transmitting, to the UE, a message indicating a direction to transmit the jamming signal.

Aspect 30: The method of any of aspects 19 through 29, wherein transmitting the indication of the jamming signal power scheme further comprises: transmitting, to the UE, a first message indicating multiple directions to transmit the jamming signal, the multiple directions based at least in part on multiple aggressor UEs; and transmitting a second message indicating the UE to select a spatial filter for transmitting the jamming signal in a direction of a majority of the multiple aggressor UEs.

Aspect 31: The method of any of aspects 19 through 30, wherein transmitting the indication of the jamming signal power scheme further comprises: transmitting a radio resource control message, or a downlink control information message, or both, comprising the indication of the jamming signal power scheme.

Aspect 32: The method of any of aspects 19 through 31, further comprising: receiving, from the UE, a signal indicating the jamming signal power scheme being used by the UE to transmit the jamming signal, the indication included in an uplink control information message.

Aspect 33: The method of any of aspects 19 through 32, further comprising: transmitting, to the UE, a message indicating a set of parameters to use for the jamming signal power scheme, the set of parameters comprising time resources, frequency resources, spatial information, a transmit power control equation, or a combination thereof.

Aspect 34: The method of aspect 33, wherein transmitting the message further comprises: transmitting a radio resource control message, or a downlink control information message, or both comprising the set of parameters.

Aspect 35: The method of any of aspects 19 through 34, further comprising: transmitting a plurality of sets of parameters associated with the jamming signal, each set of parameters transmitted via a radio resource control message; and transmitting a message indicating a set of parameters of the plurality of sets of parameters to use for the jamming signal power scheme, wherein the message is a downlink control information message.

Aspect 36: An apparatus for wireless communications, comprising a processor; memory coupled with the processor; and instructions stored in the memory and executable by the processor to cause the apparatus to perform a method of any of aspects 1 through 18.

Aspect 37: An apparatus for wireless communications, comprising at least one means for performing a method of any of aspects 1 through 18.

Aspect 38: A non-transitory computer-readable medium storing code for wireless communications, the code comprising instructions executable by a processor to perform a method of any of aspects 1 through 18.

Aspect 39: An apparatus for wireless communications, comprising a processor; memory coupled with the processor; and instructions stored in the memory and executable by the processor to cause the apparatus to perform a method of any of aspects 19 through 35.

Aspect 40: An apparatus for wireless communications, comprising at least one means for performing a method of any of aspects 19 through 35.

Aspect 41: A non-transitory computer-readable medium storing code for wireless communications, the code comprising instructions executable by a processor to perform a method of any of aspects 19 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a control signal scheduling the UE to receive a downlink message from a network device via a set of time and frequency resources;
   identifying an aggressor UE in between a communication range of the UE and the network device;
   determining a transmit power for transmitting a jamming signal via at least a portion of the set of time and frequency resources based on the aggressor UE; and
   applying a jamming signal power scheme to the jamming signal based on a level of self-interference associated with transmitting the lamming signal with the determined transmit power, wherein applying the jamming signal power scheme comprises either using the determined transmit power or adjusting the determined transmit power for transmitting the jamming signal in accordance with the jamming signal power scheme.

2. The method of claim 1, wherein identifying the aggressor UE further comprises:
   receiving a signal comprising at least one of a direction to the aggressor UE or an estimated path between the UE and the aggressor UE.

3. The method of claim 1, wherein applying the jamming signal power scheme further comprises:
   reducing the determined transmit power for the jamming signal based at least in part on determining that the level of self-interference is greater than a self-interference threshold.

4. The method of claim 1, wherein applying the jamming signal power scheme further comprises:
   refraining from transmitting the jamming signal based at least in part on determining that the level of self-interference is greater than a self-interference threshold.

5. The method of claim 1, wherein applying the jamming signal power scheme further comprises:
   transmitting the jamming signal using the determined transmit power based at least in part on the level of self-interference.

6. The method of claim 1, further comprising:
   receiving an indication of a range of potential path loss values, the range comprising a minimum potential path loss and a maximum potential path loss between the UE and the aggressor UE, wherein determining the transmit power for transmitting the jamming signal is further based at least in part on the maximum potential path loss.

7. The method of claim 6, wherein determining the transmit power for transmitting the jamming signal comprises:
   determining the transmit power for transmitting the jamming signal using a next lower potential path loss in the range after the maximum potential path loss based at least in part on determining that the level of self-interference associated with using the maximum potential path loss to determine the transmit power is greater than a self-interference threshold.

8. The method of claim 1, wherein the UE is configured with a procedure for determining the level of self-interference based at least in part on the determined transmit power.

9. The method of claim 1, further comprising:
   receiving an indication of a maximum transmission power for transmitting jamming signals, wherein determining the transmit power for transmitting the jamming signal is further based at least in part on the maximum transmission power.

10. The method of claim 1, further comprising:
    receiving an indication of a path loss between the UE and the aggressor UE, wherein determining the transmit power is based at least in part on the path loss.

11. The method of claim 1, further comprising:
    receiving an indication of a direction to transmit the jamming signal, wherein applying the jamming signal power scheme comprises transmitting the jamming signal via the direction.

12. The method of claim 1, further comprising:
    receiving an indication of multiple directions to transmit the jamming signal, the multiple directions based at least in part on multiple aggressor UEs; and
    applying a spatial filter to transmit the jamming signal, wherein the spatial filter is selected based at least in part on transmitting the jamming signal via a direction of a majority of the multiple aggressor UEs.

13. The method of claim 1, further comprising:
    receiving a radio resource control message, or a downlink control information message, or both comprising an indication of the jamming signal power scheme to use.

14. The method of claim 1, further comprising:
    transmitting, for the network device, an uplink control information message comprising an indication of the jamming signal power scheme being used by the UE to transmit the jamming signal.

15. The method of claim 1, further comprising:
    receiving an indication of a set of parameters to use for the jamming signal power scheme, the set of parameters comprising time resources, frequency resources, spatial information, a transmit power control equation, or a combination thereof, wherein determining the transmit power is further based at least in part on the set of parameters.

16. A method for wireless communications at a network device, comprising:
transmitting a control signal scheduling a user equipment (UE) to receive a downlink message from the network device using a set of time and frequency resources;
identifying an aggressor UE in between a communication range of the UE and the network device; and
transmitting, based on the aggressor UE, an indication of a jamming signal power scheme for the UE, the jamming signal power scheme associated with transmitting, via at least a portion of the set of time and frequency resources, a jamming signal based on a level of self-interference at the UE associated with the UE transmitting the jamming signal.

17. The method of claim 16, wherein transmitting the indication of the jamming signal power scheme further comprises:
transmitting a message indicating the UE to determine the level of self-interference at the UE associated with transmitting the jamming signal in accordance with a transmit power and to compare the level of self-interference to a self-interference threshold.

18. The method of claim 17, wherein transmitting the message comprises:
transmitting the message indicating the UE to reduce the transmit power for the jamming signal if the level of self-interference is greater than the self-interference threshold.

19. The method of claim 17, wherein transmitting the message comprises:
transmitting the message indicating the UE to refrain from transmitting the jamming signal if the level of self-interference is greater than the self-interference threshold.

20. The method of claim 17, further comprising:
receiving one or more path loss reference signals associated with the aggressor UE and the UE; and
transmitting a signal indicating a range of potential path loss values based at least in part on the one or more path loss reference signals associated with the aggressor UE and the UE, the range comprising a minimum potential path loss and a maximum potential path loss between the UE and the aggressor UE.

21. The method of claim 20, wherein transmitting the indication of the jamming signal power scheme further comprises:
transmitting a second signal indicating the UE to determine the transmit power for transmitting the jamming signal starting with the maximum potential path loss, then using a next lower potential path loss in the range after the maximum potential path loss if the level of self-interference associated with using the maximum potential path loss is greater than the self-interference threshold.

22. The method of claim 17, further comprising:
transmitting a signal indicating a procedure for determining the level of self-interference based at least in part on the transmit power for the jamming signal.

23. The method of claim 16, further comprising:
transmitting a message indicating a maximum transmission power for transmitting jamming signals at the UE.

24. The method of claim 16, further comprising:
receiving one or more path loss reference signals associated with the aggressor UE and the UE; and
transmitting a message indicating a path loss between the UE and the aggressor UE based at least in part on the one or more path loss reference signals associated with the aggressor UE and the UE.

25. The method of claim 16, wherein transmitting the indication of the jamming signal power scheme further comprises:
transmitting a message indicating a direction for the UE to transmit the jamming signal.

26. The method of claim 16, wherein transmitting the indication of the jamming signal power scheme further comprises:
transmitting a first message indicating multiple directions for the UE to transmit the jamming signal, the multiple directions based at least in part on multiple aggressor UEs; and
transmitting a second message indicating the UE to select a spatial filter for transmitting the jamming signal in a direction of a majority of the multiple aggressor UEs.

27. The method of claim 16, further comprising:
receiving an uplink control information message indicating the jamming signal power scheme being used at the UE to transmit the jamming signal.

28. An apparatus for wireless communications, comprising:
a processor;
memory coupled with the processor; and
instructions stored in the memory and executable by the processor to cause the apparatus to:
receive a control signal scheduling a user equipment (UE) to receive a downlink message from a network device via a set of time and frequency resources;
identify an aggressor UE in a communication range of the UE and the network device;
determine a transmit power for transmitting a jamming signal via at least a portion of the set of time and frequency resources based on the aggressor UE; and
apply a jamming signal power scheme to the jamming signal based on a level of self-interference associated with transmitting the jamming signal with the determined transmit power, wherein applying the jamming signal power scheme comprises either using the determined transmit power or adjusting the determined transmit power for transmitting the jamming signal in accordance with the jamming signal power scheme.

29. An apparatus for wireless communications, comprising:
a processor;
memory coupled with the processor; and
instructions stored in the memory and executable by the processor to cause the apparatus to:
transmit a control signal scheduling a user equipment (UE) to receive a downlink message from a network device using a set of time and frequency resources;
identify an aggressor UE in between a communication range of the UE and the network device; and
transmit, based on the aggressor UE, an indication of a jamming signal power scheme for the UE, the jamming signal power scheme associated with transmitting, via at least a portion of the set of time and frequency resources, a jamming signal based on a level of self-interference at the UE associated with the UE transmitting the jamming signal.

* * * * *